(12) United States Patent
Noh et al.

(10) Patent No.: US 11,193,700 B2
(45) Date of Patent: Dec. 7, 2021

(54) LINEAR COMPRESSOR WITH HEAT SHIELD BETWEEN DISCHARGE COVER AND FRAME

(71) Applicant: LG Electronics Inc., Seoul (KR)

(72) Inventors: Kiwon Noh, Seoul (KR); Kwangwoon Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 196 days.

(21) Appl. No.: 16/157,825

(22) Filed: Oct. 11, 2018

(65) Prior Publication Data

US 2019/0107312 A1   Apr. 11, 2019

(30) Foreign Application Priority Data

Oct. 11, 2017  (KR) .................. 10-2017-0131609
Oct. 11, 2017  (KR) .................. 10-2017-0131612

(51) Int. Cl.

| | | |
|---|---|---|
| F25B 31/02 | (2006.01) | |
| F04B 17/03 | (2006.01) | |
| F04B 19/22 | (2006.01) | |
| F04B 19/04 | (2006.01) | |
| F04B 53/16 | (2006.01) | |
| F16C 32/06 | (2006.01) | |
| F16C 33/72 | (2006.01) | |

(Continued)

(52) U.S. Cl.
CPC ............ F25B 31/023 (2013.01); F04B 17/03 (2013.01); F04B 19/04 (2013.01); F04B 19/22 (2013.01); F04B 35/045 (2013.01); F04B 39/0027 (2013.01); F04B 39/02 (2013.01); F04B 39/06 (2013.01); F04B 39/123 (2013.01);

(Continued)

(58) Field of Classification Search
None
See application file for complete search history.

(56) References Cited

U.S. PATENT DOCUMENTS 4,121,125 A * 10/1978 Dolz ................. F04B 35/045
310/27
6,824,365 B2 * 11/2004 Park ................. F04B 39/0061
181/403

(Continued)

FOREIGN PATENT DOCUMENTS

BR   102016029873   * 12/2016
EP   3196460          7/2017

(Continued)

OTHER PUBLICATIONS

European Search Report in European Patent Application No. 18199473. 2, dated Jan. 18, 2019, 8 pages.

*Primary Examiner* — Peter J Bertheaud
*Assistant Examiner* — Geoffrey S Lee
(74) *Attorney, Agent, or Firm* — Fish & Richardson P.C.

(57) ABSTRACT

A linear compressor includes a linear motor including a mover that reciprocates with respect to a stator; a compression unit configured to define a compression space in a cylinder while a piston connected to the mover reciprocates in the cylinder; a frame disposed outside of the cylinder; a plurality of discharge covers that define discharge spaces sequentially receiving refrigerant discharged from the compression space; and a gas bearing configured to guide part of refrigerant accommodated in a discharge any one of the plurality of discharge covers to lubricate between the cylinder and the piston with the refrigerant. The discharge cover structure is configured to restrict heat transfer between the discharge covers and the frame.

23 Claims, 17 Drawing Sheets

(51) Int. Cl.

| | | |
|---|---|---|
| *H02K 33/12* | (2006.01) | |
| *F04B 53/18* | (2006.01) | |
| *F04B 35/04* | (2006.01) | |
| *F04B 39/12* | (2006.01) | |
| *F04B 53/08* | (2006.01) | |
| *F04B 39/02* | (2006.01) | |
| *F04B 39/00* | (2006.01) | |
| *F04B 39/06* | (2006.01) | |

(52) U.S. Cl.
CPC ............ *F04B 39/125* (2013.01); *F04B 53/08* (2013.01); *F04B 53/16* (2013.01); *F04B 53/18* (2013.01); *F16C 32/0607* (2013.01); *F16C 33/72* (2013.01); *H02K 33/12* (2013.01); *F16C 2360/42* (2013.01); *F25B 2500/08* (2013.01)

(56) References Cited

U.S. PATENT DOCUMENTS

| | | | | |
|---|---|---|---|---|
| 7,491,040 | B2 * | 2/2009 | McCombs | F04B 35/04 |
| | | | | 417/312 |
| 8,556,599 | B2 * | 10/2013 | Lee | F04B 35/045 |
| | | | | 417/417 |
| 9,890,775 | B2 * | 2/2018 | Kim | F04B 53/1035 |
| 10,670,004 | B2 * | 6/2020 | Bae | F04B 39/121 |
| 2005/0047947 | A1 * | 3/2005 | McCombs | F04B 39/1073 |
| | | | | 417/545 |
| 2010/0310389 | A1 * | 12/2010 | Alvarenga | F04B 39/0055 |
| | | | | 417/312 |
| 2014/0053720 | A1 * | 2/2014 | Ahn | F04B 39/123 |
| | | | | 91/418 |
| 2016/0017883 | A1 * | 1/2016 | Noh | F04B 35/045 |
| | | | | 417/437 |
| 2017/0321692 | A1 * | 11/2017 | Bae | F04B 39/0027 |
| 2017/0370354 | A1 * | 12/2017 | Jeong | F04B 35/045 |
| 2018/0347555 | A1 * | 12/2018 | De Bortoli | F04B 39/0072 |

FOREIGN PATENT DOCUMENTS

| | | | |
|---|---|---|---|
| KR | 1020060081482 | | 7/2006 |
| KR | 1020080012710 | | 2/2008 |
| KR | 1020080012714 | | 2/2008 |
| KR | 1020140030744 | | 3/2014 |
| KR | 10-2016-0078834 | * | 6/2016 |
| KR | 1020170074527 | | 6/2017 |
| KR | 1020170086841 | | 7/2017 |

* cited by examiner

LINEAR COMPRESSOR WITH HEAT SHIELD BETWEEN DISCHARGE COVER AND FRAME

CROSS-REFERENCE TO RELATED APPLICATIONS

The present disclosure claims the benefit of an earlier filing date and right of priority to Korean Application Nos. 10-2017-0131612 and 10-2017-0131609, filed on Oct. 11, 2017, which are herein expressly incorporated by reference in their entirety.

FIELD

The present disclosure relates to a linear compressor.

BACKGROUND

A reciprocating compressor is a compressor formed with a compression space between a piston and a cylinder to allow the piston to linearly reciprocate so as to compress fluid. For a reciprocating compressor, there are known a crank method for compressing refrigerant by converting a rotational force of a rotary motor into a linear movement, and a vibration method for compressing refrigerant using a linear motor that reciprocates linearly. The vibration type reciprocating compressor is referred to as a linear compressor, and such a linear compressor has no mechanical loss in converting a rotational movement into a linear reciprocating movement, thereby having an advantage of improving the efficiency and simplifying the structure.

The linear compressor may be divided into an oil-lubricated linear compressor and a gas-lubricated linear compressor according to the lubrication method. The oil-lubricated linear compressor is configured to store a predetermined amount of oil in the casing using the oil as disclosed in Patent Document 1 (Korean Patent Publication No. KR10-2015-0040027). On the contrary, the gas-lubricated linear compressor is configured to guide part of refrigerant being discharged from the compression space without being stored into the casing between the cylinder and the piston to lubricate between the cylinder and the piston by a gas force of the refrigerant as disclosed in Patent Document 2 (Korean Patent Publication No. KR10-2016-0024217).

Both the oil-lubricated linear compressor and the gas-lubricated linear compressor as described above support an outer stator and an inner stator, which form a stator of the linear motor, as a frame. As a result, a gap allowing a mover to reciprocate between the outer stator and the inner stator may be constantly maintained. Furthermore, the inner stator is inserted into an outer circumferential surface of the frame and the cylinder is inserted into an inner circumferential surface of the frame to support the radial and axial directions of the inner stator and the cylinder.

Moreover, in the case of the gas-lubricated type, the frame and the cylinder are assembled to secure a predetermined gap so as to form a refrigerant flow path forming a gas bearing between an inner circumferential surface of the frame and an outer circumferential surface of the cylinder.

However, in the foregoing gas-lubricated linear compressor in the related art, the cylinder and the piston are heated by refrigerant because the cylinder and the piston are lubricated using high-temperature refrigerant gas, and due to this, refrigerant sucked into the compression space or refrigerant compressed in the compression space is overheated, thereby causing suction loss or compression loss.

Furthermore, in the gas-lubricated linear compressor in the related art, refrigerant discharged from the compression space of the cylinder to a discharge space of the discharge cover heats the discharge cover, and the heated discharge cover transfers heat to the frame in contact therewith, thereby increasing suction loss or compression loss described above.

In addition, in the gas-lubricated linear compressor in the related art, refrigerant discharged from the compression space of the cylinder to the discharge space of the discharge cover is directly in contact with the frame and the cylinder to heat the frame together with the cylinder, thereby increasing suction loss and compression loss described above.

Moreover, in the gas-lubricated linear compressor in the related art, a plurality of discharge covers sequentially communicated with each other are installed in an overlapping manner to reduce the pulsation of refrigerant discharged from the compression space, but due to this, the discharge cover has a low heat radiation effect, thereby increasing suction loss or compression loss as described above. In particular, as the discharge cover in contact with the frame is directly communicated with the compression space, the discharge cover has a higher temperature than other discharge covers, and when the discharge cover is located on an inside side of the other discharge covers, the discharge cover at the highest temperature is unable to be in contact with the refrigerant of the casing, thereby further deteriorating heat dissipation.

Besides, in the gas-lubricated linear compressor in the related art, a flow rate of refrigerant passing between the discharge cover and the casing is reduced with respect to the same amount of refrigerant since a distance between the discharge cover and the casing is large, and due to this, a convection heat transfer coefficient for the discharge cover is decreased, thereby further reducing a heat radiation effect for the discharge cover as a whole. This may heat the cylinder through the frame in contact with the discharge cover, as described above, thereby further increasing suction loss and compression loss.

SUMMARY

An object of the present disclosure is to provide a linear compressor capable of suppressing suction loss or compression loss from occurring while refrigerant sucked into the compression space or refrigerant compressed in the compression space is overheated when the cylinder and the piston is heated by the refrigerant.

Furthermore, another object of the present disclosure is to provide a linear compressor capable of preventing heat from being conducted between the discharge cover and the frame, thereby suppressing the frame from being by the discharge cover.

In addition, still another object of the present disclosure is to provide a linear compressor capable of preventing refrigerant discharged to the discharge space of the discharge cover from being brought into contact with the frame and the cylinder to suppress the frame and the cylinder from being heated by the refrigerant discharged to the discharge cover, thereby increasing the compressor efficiency.

Moreover, yet still another object of the present disclosure is to provide a linear compressor capable of increasing a heat dissipation area of the discharge cover having a relatively high temperature to increase the cooling effect on the discharge cover, thereby reducing heat transferred to the frame by the discharge cover.

Besides, still yet another object of the present disclosure is to provide a linear compressor capable of allowing refrigerant lubricating between the cylinder and the piston to flow at a relatively low temperature, thereby preventing the cylinder and the piston from being heated.

Additionally, yet still another object of the present disclosure is to provide a linear compressor capable of increasing a flow rate of refrigerant passing between the discharge cover and the casing to increase a convective heat transfer coefficient, thereby rapidly cooling the discharge cover.

In order to solve the objective of the present disclosure, there is provided a linear compressor, including a linear motor in which a mover reciprocates with respect to a stator; a compression unit configured to form a compression space in a cylinder while a piston connected to the mover of the linear motor reciprocates in the cylinder; a plurality of discharge covers in which each discharge space is provided to accommodate refrigerant discharged from the compression space, and the each discharge space is sequentially communicated therewith; and a gas bearing configured to guide part of refrigerant accommodated in a discharge space of any one of the plurality of discharge covers between the cylinder and the piston to lubricate between the cylinder and the piston with the refrigerant, wherein at least part of a discharge cover in contact with the compression unit is formed to be exposed to an outside of a discharge space of another discharge cover.

Here, at least part of a discharge cover in contact with the compression unit may be formed such that at least part of a sidewall portion constituting a discharge space of the discharge cover is exposed to an outside of a discharge space of another discharge cover.

Furthermore, when a discharge cover having a first discharge space in contact with the compression unit is referred to as a first cover, and a discharge cover having a second discharge space communicating with the first discharge space of the first cover is referred to as a second cover, the second cover may be brought into contact with and fixed to an outer side of a front portion constituting the first discharge space together with the sidewall portion.

Furthermore, at least part of an outer side of a front portion of the first cover constituting the first discharge space may be provided to be exposed to an outside of the second cover.

Furthermore, at least one of the plurality of discharge covers may be formed with a fixed portion brought into contact with and fixed to another member, and a heat radiating portion extended to an outside of the fixed portion and bent at least once may be formed.

Here, the discharge cover in contact with the compression unit may have a space portion constituting a discharge space, and a discharge guide groove recessed in a direction toward the compression unit may be formed in the space portion.

Furthermore, a connection pipe communicating with a discharge space of another discharge cover excluding the discharge cover in contact with the compression unit among the discharge covers may be inserted and accommodated into the discharge guide groove.

Furthermore, the discharge guide groove may be partly covered by another discharge cover, and the connection pipe may be inserted into the discharge guide groove through another discharge cover covering the discharge guide groove.

Here, a heat insulating member made of a material having a thermal conductivity lower than that of the discharge cover may be further provided between the discharge cover and the compression unit, and at least part of the heat insulating member may be formed to be located in a discharge space range of the discharge cover in contact with the compression unit.

Here, the gas bearing may be communicated with a discharge space of another discharge cover excluding a discharge cover whose inlet is in contact with the compression space.

Furthermore, a first discharge space constituting a primary discharge space may be communicated with a second discharge space constituting a secondary discharge space based on the order of communicating with the compression space, and an inlet of the gas bearing may be communicated with the second discharge space.

Furthermore, a space portion of a discharge cover communicating with an inlet of the gas bearing may be formed with a convex portion in which a portion facing an inlet of the gas bearing is protruded in a radial direction to accommodate the inlet of the gas bearing.

Furthermore, a space portion of the discharge cover communicating with an inlet of the gas bearing may be formed with a concave portion recessed in a radial direction not to overlap with an inlet of the gas bearing.

Furthermore, the discharge cover in contact with the compression unit may be formed with a fixed portion for covering the inlet of the gas bearing, and the fixed portion may be formed with a first gas through hole for communicating the discharge space with the inlet of the gas bearing.

Furthermore, a heat insulating member for blocking heat from being transferred from the discharge cover to the compression unit may be provided between the discharge cover and the compression unit, and the heat insulating member may be formed to overlap with the fixed portion, and the heat insulating member may be formed with a second gas through hole communicated with the first gas through hole to communicate the discharge space with an inlet of the gas bearing.

Furthermore, a sealing member surrounding the inlet of the gas bearing may be provided around the inlet of the gas bearing, and the sealing member may be closely brought into contact with the heat insulating member or the fixed portion.

In addition, in order to accomplish the object of the present disclosure, there is provided a linear compressor, including a casing having a sealed inner space; a linear motor provided in the internal space of the casing to allow a mover to reciprocate with respect to a stator; a compression unit spaced apart from an inner circumferential surface of the casing to form a compression space in a cylinder while a piston connected to the mover of the linear motor reciprocates in the cylinder; and a plurality of discharge covers provided with discharge spaces for accommodating refrigerant discharged from the compression space to allow each of the discharge spaces to communicate therewith, wherein the discharge cover in contact with the compression unit is formed to allow at least part of a sidewall portion constituting the discharge space of the discharge cover to be exposed to an inner space of the casing.

Moreover, in order to accomplish the object of the present disclosure, there is provided a linear compressor, including a casing having a sealed inner space; a linear motor provided in the internal space of the casing to allow a mover to reciprocate with respect to a stator; a compression unit spaced apart from an inner circumferential surface of the casing to form a compression space in a cylinder while a piston connected to the mover of the linear motor reciprocates in the cylinder; a gas bearing configured to guide part of refrigerant discharged from the compression space between the cylinder and the piston to lubricate the cylinder and the piston; and at least one discharge cover coupled to the compression unit and provided with a discharge space for accommodating refrigerant discharged from the compression space, wherein an inlet of the gas bearing is communicated with a discharge space of a discharge cover other than another discharge cover in contact with the compression space.

In the linear compressor according to the present disclosure, among the plurality of discharge covers, an outer surface constituting a discharge space of a discharge cover in contact with the compression unit may be formed to be exposed to an inner space of the casing to enhance a heat radiation effect for a discharge cover having the highest temperature to reduce heat being transferred from the discharge cover to the compression unit, thereby suppressing the refrigerant of the suction flow path and the compression space from being overheated.

Furthermore, the inlet of the gas bearing may be communicated with at least the second discharge cover from the compression space, thereby suppressing the cylinder and the piston from being heated while coolant at a relatively low temperature flows into the gas bearing. Through this, it may be possible to suppress refrigerant in the suction flow path and the compression space from being overheated, thereby enhancing the efficiency of the compressor.

In addition, as a heat insulating cover is provided between the discharge cover and the compression unit, it may be possible to block refrigerant accommodated in the discharge cover from being in direct contact with the frame or cylinder constituting the compression unit or reducing the contact area while at the same time blocking heat from being conducted from the discharge cover to the compression unit, thereby preventing the heat of the refrigerant from being transferred to the frame or cylinder. Through this, it may be possible to suppress refrigerant in the suction flow path and the compression space from being overheated, thereby enhancing the efficiency of the compressor.

Moreover, the heat insulating cover covers a front side of the frame or a front side of the cylinder to block or reduce refrigerant accommodated in the discharge cover from being in direct contact with the frame or the cylinder, thereby suppressing the frame or the cylinder from being heated by the refrigerant accommodated in the discharge cover. Even through this, it may be possible to suppress refrigerant in the suction flow path and the compression space from being overheated, thereby enhancing the efficiency of the compressor.

Besides, a heat insulating space portion communicating with an internal space of the casing may be formed between the heat insulating cover and the compression unit to effectively block heat transferred from the discharge cover while refrigerant at a suction pressure is filled into the heat insulating space, thereby further enhancing the efficiency of the compressor.

Furthermore, as the heat radiation portion is extended to the discharge cover, a gap between the discharge cover and the casing may be reduced, thereby increasing a flow rate of refrigerant flowing in the internal space of the casing. Accordingly, the convective heat transfer coefficient may be increased, thereby allowing the discharge cover to be more quickly heat dissipated while greatly increasing a heat transfer rate between the discharge cover and the casing.

BRIEF DESCRIPTION OF THE DRAWING

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION

Hereinafter, a linear compressor according to the present disclosure will be described in detail with reference to an embodiment illustrated in the accompanying drawings.

The linear compressor according to the present disclosure performs an operation of sucking and compressing fluid, and discharging the compressed fluid. The linear compressor according to the present disclosure may be a component of a cooling cycle, and hereinafter, the fluid will be described by taking refrigerant circulating the cooling cycle as an example.

Figure 1:
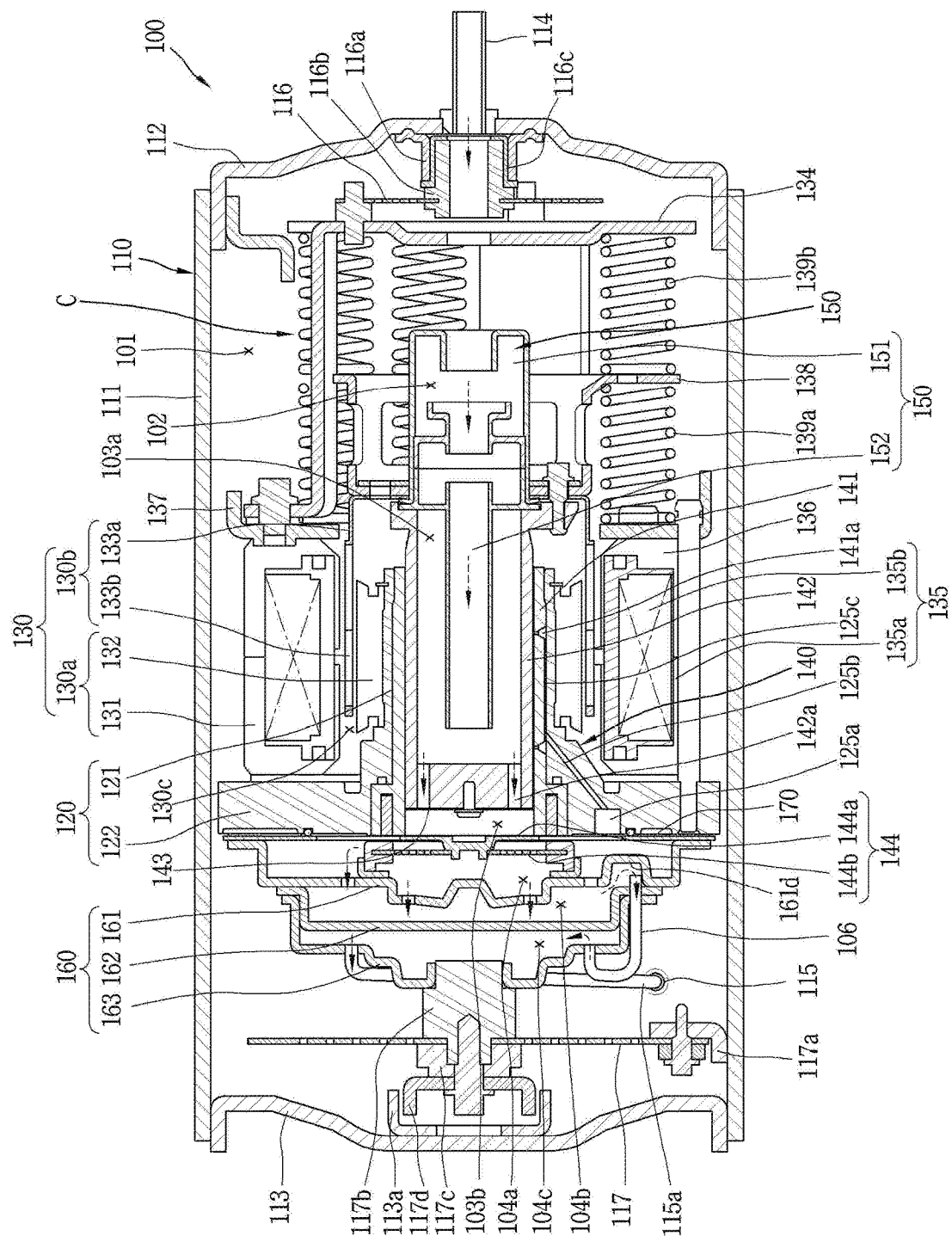
FIG. 1 is a longitudinal cross-sectional view showing a linear compressor according to the present disclosure.

Referring to FIG. 1, in the linear compressor 100 according to the present embodiment, an inner space 101 of a casing 110 may form a closed space, and an frame elastically supported by the springs 161, 162 which will be described later may be provided in the inner space 101 of the casing 110. A linear motor 130 may be coupled and supported to the frame 120, and the linear motor 130 may be coupled to a compression unit 140 for sucking, compressing and discharging refrigerant. Accordingly, the compression unit 140 may be coupled to the frame 120 together with the linear motor 130 and elastically supported with respect to the casing 110.

The casing 110 may be formed of a thermally conductive material. Through this, heat generated in the inner space 101 of the casing 110 may be radiated to the outside through the casing 110.

Furthermore, the casing 110 may include a shell 111 both ends of which are open and formed in a substantially cylindrical shape elongated in a substantially transverse direction, a first shell cover 112 coupled to a rear side of the shell 111, and a second shell cover 113 coupled to a front side thereof. Accordingly, the first shell cover 112 is placed in a horizontal direction, and the first shell cover 112 may be coupled to a right side of the shell 111, and the second shell cover 113 may be coupled to a left side of the shell 111. In a broad sense, the first shell cover 112 and the second shell cover 113 may form part of the shell 111.

An inner diameter of the shell 111 may be formed in various ways according to a size of the linear motor 130, but in the linear compressor 100 of the present embodiment, it is not required to fill oil into the inner space 101 of the casing 110 as the oil bearing is excluded and the gas bearing is applied. Therefore, the inner diameter of the shell 111 may preferably be formed to be as small as possible, for example, to such an extent that a flange portion 122 of the frame 120, which will be described later, can be spaced apart from an inner circumferential surface 111a of the casing 110. Accordingly, in the linear compressor 100 according to the present embodiment, an outer diameter of the shell 111 may be formed to be very small as compared with the above-described Patent Document 1.

The first shell cover 112 is coupled to the shell 111 to seal a rear side of the shell 111 as described above, and a suction pipe 114 may be inserted into and coupled to the first shell cover 112.

Furthermore, a cylindrically shaped suction side support member 116a may be coupled to an inner circumferential surface of the first shell cover 112, and the suction side support member 116a may be coupled to the first support spring 116 formed with a plate spring. A suction guide 116b may be inserted into and coupled to the suction side support member 116a. A central portion of the first support spring 116 may be coupled to the suction guide 116b described above, while an edge of the first support spring 116 is coupled to a back cover 134 which will be described later. As a result, a rear side of the compressor body (C) including the back cover 134 is elastically supported by the first support spring 116 in a radial direction of the casing 110 including the first shell cover 112.

Here, as the suction guide 116b is formed in a cylindrical shape and communicated with the suction pipe 114, refrigerant sucked through the suction pipe 114 may be introduced into a suction muffler assembly 150 which will be described later through the suction guide 116b.

Furthermore, a damping member 116c made of a rubber material or the like may be provided between the suction side support member 116a and the suction guide 116b. Accordingly, it may be possible to prevent vibration, which may be generated during the suction of refrigerant through the suction pipe 114, from being transferred from the suction guide 116b to the suction side support member 116a.

In addition, the second shell cover 113 is coupled to the shell 111 to seal a front side of the shell 111 as described above, and a discharge pipe 115 connected to a loop pipe 115a which will be described later may be inserted into and coupled to the second shell cover 113. Accordingly, refrigerant discharged from the compression space 103b is passed through a discharge cover assembly 160, which will be described later, and then discharged to the cooling cycle through the loop pipe 115a and the discharge pipe 115.

Furthermore, a discharge side support member 117a may be coupled to an inner side of the second shell cover 113 or an inner circumferential surface of the shell 111 in contact with the inner side of the second shell cover 113, and a second support spring 117 made of a plate spring may be coupled to the discharge side support member 117a.

A central portion of the second support spring 117 may be coupled by a support guide 117b, a support cover 117c and a first support bracket 117d which are coupled to a discharge cover assembly 160 which will be described later. The first support bracket 117d may be inserted into a second support bracket 113a fixed to an inner circumferential surface of the second shell cover 113 and supported in both axial and radial directions. As a result, a front side of the compressor body (C) including a discharge cover assembly 160 which will be described later is elastically supported by the second support spring 117 in a radial direction of the casing 110 including the second shell cover 113.

Meanwhile, a frame 120 constituting part of the compressor body (C) is provided in the casing 110. Furthermore, a motor assembly formed with the linear motor 130 and a cylinder 141 constituting the compression unit 140 may be coupled to and supported by the frame 120. Accordingly, the frame 120 may be elastically supported with respect to the casing 110 by the first support spring 116 and the second support spring 117 together with the linear motor 130 and the compression unit 140.

Here, the frame 120 may include a body portion 121 formed in a cylindrical shape and a flange portion 122 extended in a radial direction from a front end of the body portion 121.

An inner stator 132 which will be described later may be coupled to an outer circumferential surface of the body portion 121, and the cylinder 141 may be coupled to an inner circumferential surface of the body portion 121, respectively. In addition, an outer stator 131 which will be described later may be coupled to a rear side of the flange portion 122, and a discharge cover assembly 160 which will be described later may be coupled to a front side of the flange portion 122, respectively.

A bearing inlet groove 125a constituting part of a gas bearing which will be described later and a bearing communicating hole 125b penetrated from the bearing inlet groove 125a to an inner circumferential surface of the body portion 121 may be formed on one side of a front surface of the flange portion 122, and a bearing communicating groove 125c may be formed on an inner circumferential face of the body portion 121 to communicate with the bearing communicating hole 125b.

The bearing inlet groove 125a may be formed to be recessed in an axial direction by a predetermined depth, and the bearing communicating hole 125b is formed to be inclined toward an inner circumferential surface of the body portion 121 with a hole having a smaller cross-sectional area than the bearing inlet groove 125a. Furthermore, the bearing communicating groove 125c may be formed in an annular shape having a predetermined depth and an axial length on an inner circumferential surface of the body portion 121. However, the bearing communicating groove 125c may be formed on an outer circumferential surface of the cylinder 141 in contact with an inner circumferential surface of the body portion 121 or may be formed half-and-half on an the inner circumferential surface of the body portion 121 and an outer circumferential surface of the cylinder 141, respectively.

Furthermore, the cylinder 141 corresponding to the bearing communicating groove 125c may be formed with a bearing hole 141a which forms a nozzle part in the gas bearing. It will be described again while describing the cylinder.

On the other hand, the linear motor 130 may include a stator 130a and a mover 130b that reciprocates with respect to the stator 130a.

The stator 130a may include an outer stator 131 fixed to the flange portion 122 of the frame 120 and an inner stator 132 disposed inside the outer stator 131 to be separated by a predetermined gap 130c. The inner stator 132 may be inserted into and coupled to an outer circumferential surface of the body portion 121 to surround the body portion 121 of the frame 120.

The outer stator 131 may include a coil winding body 135 and a stator core 136 laminated to surround the coil winding body 135, and the coil winding body 135 may include a bobbin 135a and a coil 135b wound in a circumferential direction of the bobbin 135a. The cross-section of the coil 135b may be formed in a circular or polygonal shape, and may have a hexagonal shape, for an example.

Furthermore, the stator core 136 may be radially laminated with a plurality of lamination sheets, and a plurality of lamination blocks may be laminated along a circumferential direction.

In addition, a stator cover 137 may be provided on the other side of the outer stator 131. Accordingly, one side portion of the outer stator 131 may be supported by the frame 120, and the other side may be supported by the stator cover 137, respectively.

The inner stator 132 may be inserted into and fixed to an outer circumferential surface of the frame 120. The inner stator 132 may be formed by radially stacking a plurality of laminations.

Meanwhile, the mover 130b may include a magnet holder 133a and a magnet 133b supported by the magnet folder 133a. The magnet holder 133a may be formed in a cylindrical shape, and one end thereof is coupled to a piston 142 which will be described later, and the other end thereof is reciprocally inserted into a gap between the outer stator 131 and the inner stator 132.

The magnet 133b may be adhered and fixed to an outer circumferential surface of the magnet holder 133a or fixed thereto using an additional fixing ring (not shown). As a result, the magnet 133b may linearly reciprocate together with the magnet holder 133a by a mutual electromagnetic force formed between the outer stator 131 and the inner stator 132.

Furthermore, a spring supporter 138 is coupled to the other end of the magnet holder 133a together with the piston 142, and a first resonance spring 139a and a second resonance spring 139b for resonating the mover 130b of the linear motor 130 and the piston 142 of the compression unit 140 may be provided on both sides of the spring supporter 138.

Here, the first resonance spring 139a is may be provided between a rear surface of the stator cover 137 and a front surface of the spring supporter 138, the second resonance spring 139b is disposed between a rear side of the spring supporter 138 and a front side of the back surface 134, respectively. The back cover 134 is coupled to the stator cover 137 to support the other end of the second resonance spring 139b in an axial direction as described above.

Accordingly, the mover 130b of the linear motor 130 and the piston 142 of the compression unit 140 may suck, compress and discharge refrigerant into the compression space 103b while linearly reciprocating along an axial direction by an electromagnetic force of the linear motor 130 and an elastic force of the resonance springs 139a, 139b.

On the other hand, the compression unit 140 may include a cylinder 141, a piston 142, a suction valve 143, and a discharge valve assembly 144.

The cylinder 141 may be formed in a cylindrical shape to have a compression space 103b therein, and inserted into and fixed to an inner circumferential surface of the frame 120. A suction muffler assembly 150, which will be described later, configured to suck refrigerant into the compression space 103b and a discharge cover assembly 160, which will be described later, configured to discharge refrigerant compressed in the compression space 103b may be provided on a rear side of the cylinder 141 and a front side of the cylinder 141, respectively.

Furthermore, the remaining portion of the gas bearing for supplying discharge gas between the cylinder 141 and the piston 142 to lubricate gas between the cylinder 141 and the piston may be formed on the cylinder 141. For example, a bearing hole 141 radially penetrated at a position communicating with the bearing communicating groove 125c to guide compressed refrigerant introduced into the bearing communicating groove 125c to an inner circumferential surface of the cylinder 141 and an outer circumferential surface of the piston 142 may be formed on the cylinder 141. Of course, it may be more advantageous from the viewpoint of processing as described above that the bearing communicating groove 125c is formed on an outer circumferential surface of the cylinder 141, The bearing hole 141a may be formed as a fine hole in such a manner that the inlet is wide and the outlet serves as a nozzle. A filter (not shown) configured to block the entry of foreign matter may be provided at an inlet portion of the bearing hole 141a. The filter may be a mesh filter made of metal or may be formed by winding a member such as a fine wire. Accordingly, the inlet and outlet of the bearing hole 141a may be formed to independently communicate with each other or the inlet may be formed as an annular groove, and a plurality of the outlets may be formed at a predetermined distance along the annular groove.

Furthermore, the bearing hole 141a may be formed only on a side adjacent to the compression space 103b (hereinafter, referred to as a front side) with respect to the axial center of the cylinder 141 or may be formed on a rear side opposite thereto in consideration of the sagging of the piston 142.

The piston 142 has a suction flow path 103a therein, and may be formed in a cylindrical shape in which a front end thereof is partially open while a rear end thereof is completely open. In addition, the piston 142 may be connected to the magnet holder 133a at the rear end thereof, which is an open end to reciprocate together with the magnet holder 133a.

Furthermore, a suction port 142a communicating between the suction flow path 103a and the compression space 103b may be formed at the front end of the piston 142, and a suction valve 143 may be provided on a front side of the piston 142 to selectively open or close the suction port 142a. Accordingly, refrigerant sucked into the inner space 101 of the casing 110 may be sucked into the compression space between the cylinder 141 and the casing 110 through the suction flow path 103a and the suction port 142a of the piston 142 while opening the suction valve 143.

A discharge valve assembly 144 for opening and closing the compression space 103b may be detachably provided at a front end of the cylinder 141.

The discharge valve assembly 144 may include a discharge valve 144a and a valve spring 144b provided on a front side of the discharge valve 144a to elastically support the discharge valve 144a. The valve spring 144b may be formed with a compression coil spring, but may be formed of a plate spring in consideration of the occupied space or reliability. As a result, when the pressure of the compression space 103b exceeds a discharge pressure, the valve spring 144b is deformed forward to open the discharge valve 144a, and the refrigerant is discharged from the compression space 103b, and discharged into the first discharge space 104a of a discharge cover assembly 160 which will be described later. Furthermore, when the discharge of the refrigerant is completed, the valve spring 144b provides a restoring force to the discharge valve 144a to close the discharge valve 144a.

Meanwhile, a suction muffler assembly 150 is coupled to a rear end of the piston 142 to attenuate noise generated during the process of sucking refrigerant.

The suction muffler assembly 150 may include a suction muffler 151 communicating with the inner space 101 of the casing 110 and an inner guide 152 connected to one side of the suction muffler 151 to guide refrigerant to the suction port 142a.

The suction muffler 151 is provided outside the piston 142, and a plurality of noise spaces 102 may be formed therein by the baffle. Although the suction muffler 151 may be formed of metal, it may be formed of a plastic material in consideration of weight and insulation.

The inner guide 152 may be formed in a pipe shape to communicate with the noise space of the suction muffler, and may be inserted deeply into the suction flow path 103a of the piston 142. The inner guide 152 may be formed in a cylindrical shape having the same inner diameters at both ends thereof, but in some cases, an inner diameter of a front end which is the discharge side may be formed larger than that of a rear end opposite to the front end.

Meanwhile, a discharge cover assembly 160 for attenuating noise generated during the process of discharging refrigerant from the discharge space 103b may be coupled to a front side of the frame 120.

The discharge cover assembly 160 may be provided on a front side of the cylinder to accommodate the discharge valve assembly 144. For this purpose, the discharge cover assembly 160 may be fixedly coupled to a front side of the flange portion 122 constituting part of the frame 120.

Here, the discharge cover assembly 160 is formed of a thermally conductive material. Through this, when high-temperature refrigerant flows into the discharge cover assembly 160, heat containing the refrigerant is transferred to the casing 110 through the discharge cover assembly 160 and dissipated to an outside of the compressor.

The discharge cover assembly 160 may be composed of a single discharge cover, or may be disposed to sequentially communicate with a plurality of discharge covers. In this embodiment, the case where the discharge cover assembly 160 is composed of three discharge covers will be described as an example.

Figure 2:
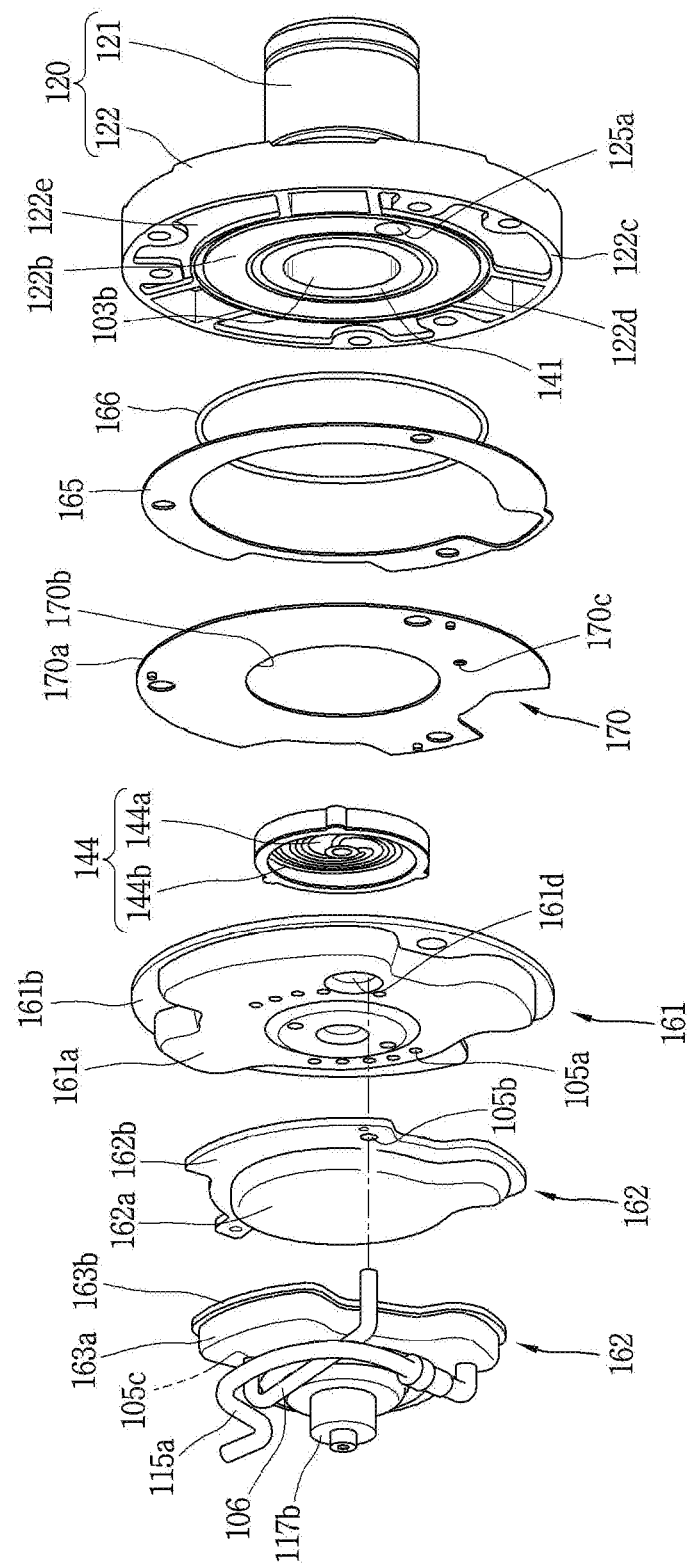
FIG. 2 is an exploded perspective view illustrating a discharge cover assembly according to FIG. 1.
Figure 3:
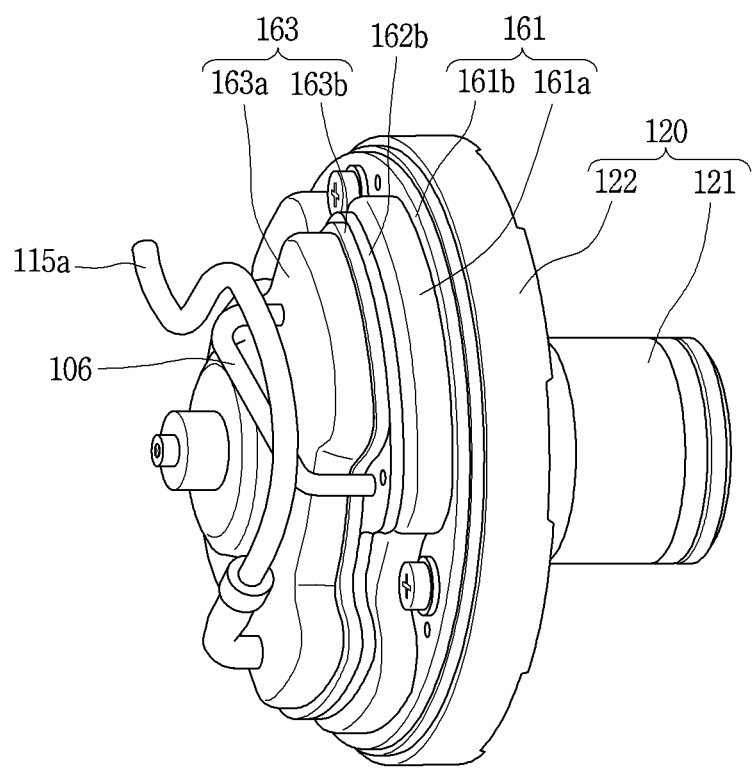
FIG. 3 is an assembled perspective view illustrating a discharge cover assembly according to FIG. 1.
Figure 4:
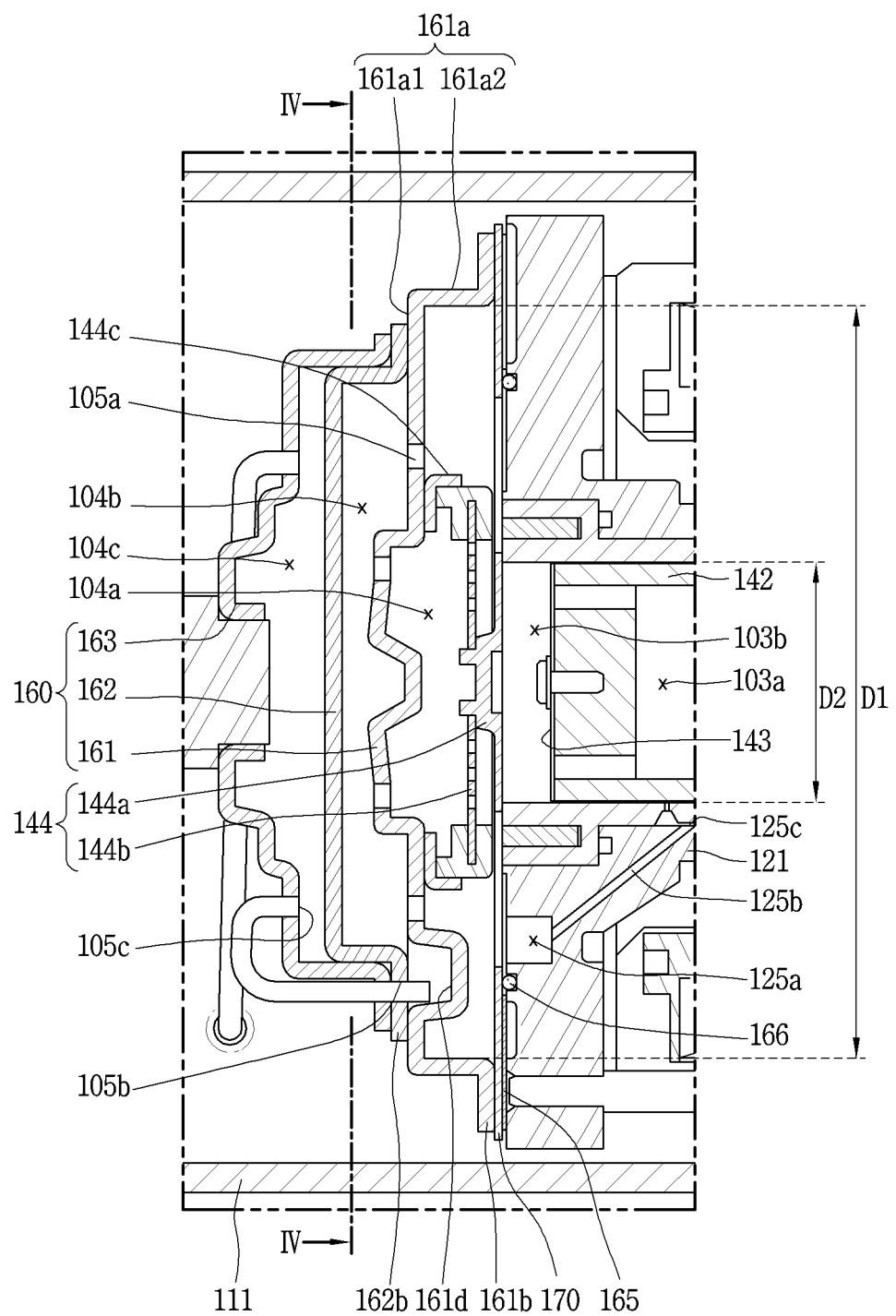
FIG. 4 is an assembled longitudinal cross-sectional view showing a discharge cover assembly according to FIG. 1.
Figure 5:
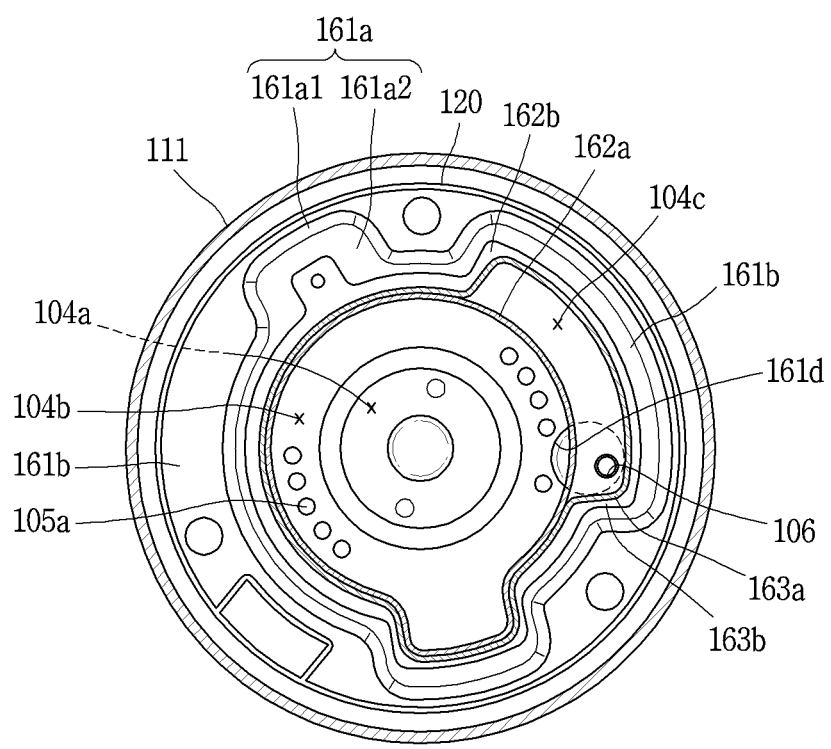
FIG. 5 is a cross-sectional view taken along line "IV-IV" in FIG. 4.

FIG. 2 is an exploded perspective view showing the discharge cover assembly according to FIG. 1, FIG. 3 is an assembled perspective view showing the discharge cover assembly according to FIG. 1, FIG. 4 is a broken perspective view showing the discharge cover assembly according to FIG. 3, and FIG. 5 is a longitudinal cross-sectional view showing a state in which the discharge cover assembly according to FIG. 4 is assembled to the frame.

Referring to these drawings, when there are three discharge covers, a discharge space (hereinafter, referred to as a first discharge space) 104a of a discharge cover (hereinafter, referred to as a first cover) 161 which is firstly brought into contact with the frame 120, may be communicated with a discharge space (hereinafter, referred to as a second discharge space) 104b of a second discharge cover (hereinafter, referred to as a second cover) 162 coupled to a front side of the first cover 161, and the second discharge space 104b may be communicated with a discharge space (hereinafter, referred to as a third discharge space) 104c of a third discharge cover (hereinafter, referred to as a third cover) 163 coupled to a front side of the second cover 162.

As shown in FIG. 2, a first space portion 161a may be formed at a central portion of the first cover 161, a second space portion 162a at a central portion of the second cover 162, and a third space portion 163a at a central portion of the third cover 163.

Furthermore, the first space portion 161a may be formed with a first discharge space 104a for accommodating the compression space 103b, the second space portion 162a with a second discharge space 104b for accommodating the first discharge space 104a, and the third space portion 163a with a third discharge space 104c for accommodating the second discharge space 104b, respectively.

In addition, the first discharge space 104a may be selectively communicated with the compression space 103b by the discharge valve 144a, the second discharge space 104b with the first discharge space 104a, and the third discharge space 104c with the second discharge space 104b, respectively. Accordingly, refrigerant discharged from the compression space 103b may be sequentially passed through the first discharge space 104a, the second discharge space 104b, and the third discharge space 104c to attenuate discharge noise, and then discharged to an outside of the casing 110 through the loop pipe 115a and the discharge pipe 115 communicated with the third space portion 163a.

Here, the first space portion 161a may be formed to be completely accommodated in the second space portion 162a. However, in this case, the first space portion 161a at a relatively high temperature is completely isolated from the inner space 101 of the casing 110, and relatively low temperature excludes contact with suction refrigerant. Then, heat is not easily dissipated from the first cover 161 to heat the frame 120. Therefore, at least part of the first space portion 161a is preferably formed to be exposed to an outside of the second space portion 162a. It will be described again later.

The first communicating hole 105a may be formed in the first space portion 161a and the first communicating hole 105a may be formed to be communicated in the second discharge space 104b. Thus, the first discharge space 104a and the second discharge space 104b may be directly communicated by the first communicating hole 105a.

The second space portion 162a may be formed such that part of the second space portion 162a is exposed to an outside of the third space portion 163a without being completely accommodated in the third space portion 163a. However, in this case, an axial length of the second space portion 162a and the third space portion 163a may be increased to increase a length of the compressor as a whole. On the contrary, when the second space portion 162a is not completely accommodated in the third space portion 163a, a heat radiation effect of the second cover 162 may be enhanced to an extent that the second space portion 162a is exposed to the inner space 101 of the casing 110. It will also be described again later.

Accordingly, the second space portion 162a is formed to be smaller than the third space portion 163a such that the third space portion 163a is formed to completely accommodate the second space portion 162a, and a third fixed portion 163b which will be described later may be welded and fixed to the first space portion 161a together with a second fixed portion 162b.

Furthermore, the second discharge space 104b and the third discharge space 104c may form a communicating hole in the second space portion 162a to directly communicate the second discharge space 104b with the third discharge space 104c. In this case, however, pulsation noise may not be attenuated to increase the discharge noise of the compressor as a whole. Therefore, the second discharge space 104b of the second space portion 162a and the third discharge space 104c of the third space portion 163a may be communicated with each other using a connection pipe 106.

However, when the second space portion 162a is completely accommodated in the third space portion 163a, it is difficult to connect the second discharge space 104b to the third discharge space 104c with the connection pipe 106. In this case, one end of the connection pipe may be passed through a second communicating hole 105b provided in the second fixed portion 162b which will be described later to communicate with the second discharge space 104b at a discharge guide groove 161d provided in the first space portion 161a. Of course, the other end of the connection pipe 106 may be connected to the third communicating hole 105c provided in the third space portion 163a, and thus the second discharge space 104b and the third discharge space 104c may be connected to each other by the connection pipe 106.

Though not shown in the drawing, as the first space portion 161a is exposed to an outside of the second space portion 162a, a gap between the first discharge space 104a and the second discharge space 104b may be connected with an additional connection pipe (not shown). In this case, as the length of the connection pipe increases, the effect of attenuating noise in the first cover 161 and the second cover 162 may be further improved.

On the other hand, an inner diameter (D1) of the first space portion 161a may preferably be larger than an inner diameter (D2) of the cylinder 141. Moreover, the first space portion 161a may be formed to have a width enough to accommodate the bearing inlet groove 125a constituting the inlet of the gas bearing as described above.

Here, when a second heat insulating portion 172 of the heat insulating cover 170 which will be described later covers the bearing inlet groove 125a, a gas through hole 170c may be formed in the second heat insulating portion 172. The bearing inlet groove 125a may be communicated with the first discharge space 104a by the gas through hole 170c while being covered by the second heat insulating portion 172.

Furthermore, the first space portion 161a may be bent in two or more multiple steps from a first fixed portion 161b, which will be described later, and convexly formed forward. However, as the second space portion 162a is formed at a low depth, the first space portion 161a may be bent in one step and convexly formed only at the central portion thereof. Accordingly, an annular support bracket 144c capable of inserting and fixing the discharge valve assembly 144 may be further provided inside the first space portion 161a.

In addition, the first space portion 161a may include a first front portion 161a1 forming one side surface in the axial direction of the first discharge space 104a and a second front portion 161b1 extended from an edge of the first front portion 161a1 to form a side surface in a radial direction of the first discharge space 104a.

The above described convex portion (not shown) may be formed at a central portion of the first front portion 161a1, and the first communicating hole 105a for guiding the refrigerant of the first discharge space 104a to the second discharge space 104b may be formed around the convex portion. A plurality of first communicating holes 105a may be formed to surround the convex portion.

Furthermore, the discharge guide groove 161d described above may be formed to be recessed in a direction toward the front side 122b of the frame 120 in the vicinity of one side edge of the first front portion 161a1. The discharge guide groove 161d may have a larger cross sectional area toward the front side (opening side) so that part of the discharge guide groove 161d can be partially open by the second fixed portion 162b which will be described later.

The first side wall portion 161a2 is formed to have a predetermined height, and a support bracket 144c supporting the discharge valve assembly 144 is provided on an inner side of the first front portion 161a1, and thus the first side wall portion 161a2 is preferably formed to have a height enough to stably move the discharge valve assembly 144 in the first discharge space 104b discharge valve assembly 161a2.

Furthermore, for the first sidewall portion 161a2, as the second fixed portion 162b which will be described later is fixed to an outer surface of the first front portion 161a1, an entire outer surface of the first sidewall portion 161a2 may be exposed to the inner space 101 of the casing 110. As a result, high-temperature refrigerant at about 70° C. discharged to the first discharge space 104a may quickly radiate heat from the first cover 161 while exchanging heat with refrigerant circulating in the internal space 101 of the casing 110 through the sidewall portion 161a2 of the first cover 161.

In addition, an area of the second space portion 162a may be formed to be smaller than that of the first space portion 161a. Accordingly, the second space portion 162a may be formed to be positioned within a range of the first space portion 161a in an axial direction. Moreover, a volume of the second space portion 162a may be formed to be significantly smaller than that of the first space portion 161a.

Furthermore, an area of the third space portion 163a may be formed to be smaller than that of the first space portion 161a but larger than that of the second space portion 162a. Accordingly, the third space portion 163a may completely accommodate the second space portion 162a as described above, and thus the third space portion 163a may be welded and fixed to an outer surface of the front portion 161a1 of the first space portion 161a together with the second space portion 162a. In addition, the third communicating hole 105c may be formed in the third space 163a such that the other end of the connection pipe 106 is inserted thereinto to communicate with the third discharge space 104c.

On the other hand, the first cover 161 may be further formed with a first fixed portion 161b extended from an edge of the first space portion 161a, the second cover 162 with a second fixed portion 161b extended from an edge of the second space portion 162a, and the third cover 163 with a third fixed portion 163b extended from an edge of the third space portion 163a, respectively. Each of the fixed portions 161b, 162b, 163b may be extended in a radial direction from each of the space portions 161a, 162a, 163a and formed in a flange shape to be closely brought into contact with a front side of the flange portion 122 of the frame 120, and the second communicating hole 105b may be formed in the second fixed portion 161b to insert the connection pipe 106 thereinto.

As a result, the first fixed portion 161b may be closely brought into contact with the front side 122b of the frame 120 by a gasket 165 interposed therebetween and bolt-fastened to the frame 120, and the second fixed portion 162b may be closely brought into contact with and welded to an outer side surface of the front portion 161a1 of the first space portion 161a together with the third fixed portion 163b.

The foregoing linear compressor according to this embodiment operates as follows.

In other words, when a current is applied to the coil 135b of the linear motor 130, a magnetic flux is formed between the outer stator 131 and the inner stator 132, and the mover 130b composed of the magnet holder 130b and the magnet 133b linearly reciprocates at the gap between the outer stator 131 and the inner stator 132 by an electromagnetic force generated by the magnetic flux.

Then, the volume of the compression space 103b is increased or decreased while the piston 142 connected to the magnet holder 130b linearly reciprocates in the cylinder 141. At this time, the suction valve 143 is open to suck the refrigerant of the suction flow path 103a into the compression space 103b when the piston 142 moves backward to increase the volume of the compression space 103b while piston 142 compresses the refrigerant of the compression space 103b when the piston 142 moves forward to reduce the volume of the compression space 103b. The compressed refrigerant is discharged into the first discharge space 104a while opening the discharge valve 144a.

Then, part of the refrigerant discharged into the first discharge space 104a is passed through the bearing inlet groove 125a, the bearing communicating hole 125b, and the bearing communicating groove 125c of the gas bearing and supplied between an inner circumferential surface of the cylinder and an outer circumferential surface of the piston 142 to support the piston 142 with respect to the cylinder 141. On the contrary, the remaining refrigerant moves to the second discharge space 104b through the first communicating hole 105a, and then flows to the third discharge space 104c through the second communicating hole 105b, the connection pipe 106, and the third communicating hole 105c to attenuate noise. A series of processes in which the refrigerant moving to the third discharge space 104c is discharged to an outside of the compressor through the loop pipe 115a and the discharge pipe 115 and moved to the condenser of the cooling cycle are repeated.

At this time, motor heat is generated from the linear motor 130, and compression heat is received by refrigerant discharged from the compression space 103b in the discharge cover assembly 160. The motor heat and the compression heat are respectively transferred to the cylinder 141 and the piston 142 through the frame 120.

Then, refrigerant sucked into the suction flow path 103a of the piston 142 as well as refrigerant sucked into the compression space 103b of the cylinder 141 are heated to generate suction loss or compression loss while a specific volume of refrigerant increases, thereby reducing the overall efficiency of the compressor.

In particular, when the oil bearing is applied to the linear compressor, the temperature of the compression unit may be reduced while oil at a relatively low temperature circulates between the cylinder and the piston. However, in the case where the oil bearing is excluded and the gas bearing is applied as shown in the present embodiment, the temperature of the compression unit may further rise as refrigerant at a high temperature flows into a gap between the cylinder and the piston, thereby further increasing the temperature rise of the refrigerant described above.

Moreover, as the temperature of the discharge cover assembly, particularly, the first cover in contact with the frame, is maintained at a high temperature of about 70° C. by refrigerant discharged from the compression space to the discharge cover assembly, the temperature of the frame in contact with the discharge cover assembly and the cylinder in contact with refrigerant accommodated in the discharge cover assembly also rises. Then, while the temperature of the refrigerant described above is further increased, the efficiency of the compressor may be lowered.

As a result, in the linear compressor according to the present disclosure, the space portion 161a of the first cover 161 accommodating refrigerant having the highest temperature in the discharge cover assembly 160 may be exposed to the inner space 101 of the casing maintaining a relatively low temperature, thereby quickly dissipating the heat of the refrigerant accommodated in the first space portion 161a by the refrigerant of the casing 110.

Through this, the discharge cover assembly 160 may be blocked from excessively heating the frame 120 or the cylinder 141, thereby suppressing refrigerant sucked into the compression space 103b or compressed refrigerant from being overheated to prevent suction loss or compression loss from being generated from the compression unit in advance.

Figure 6:
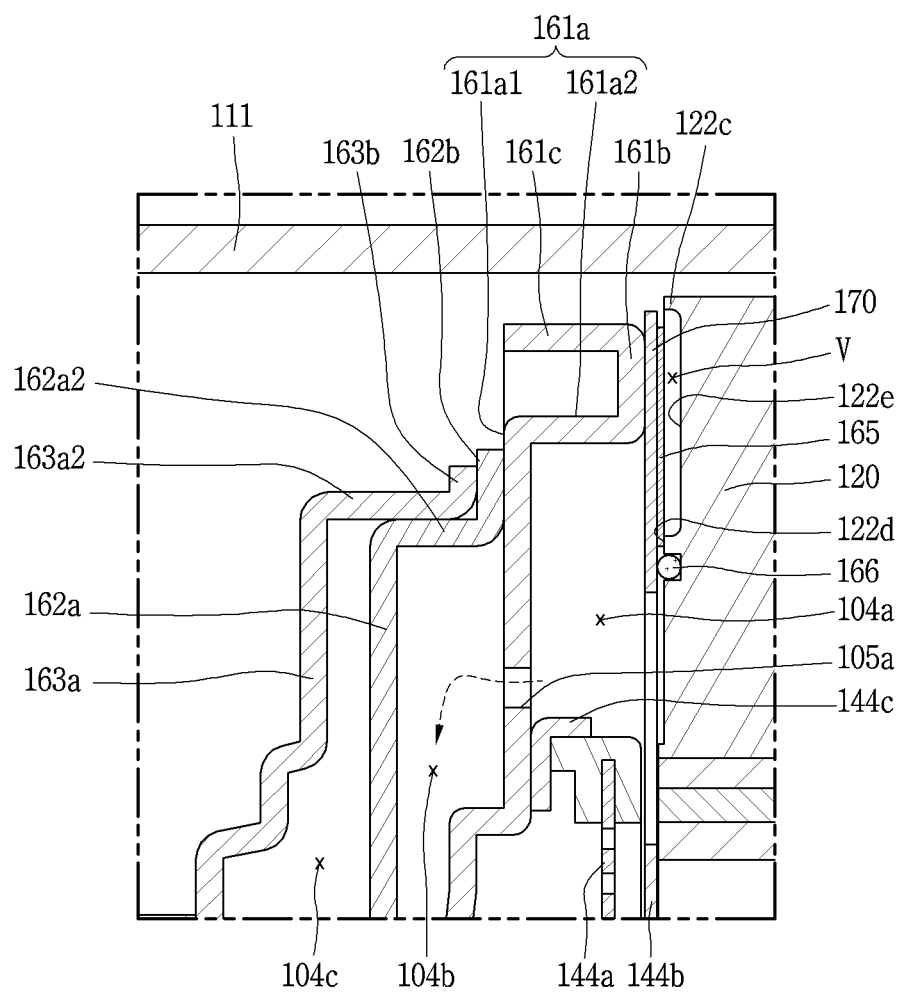
FIG. 6 is a perspective view showing another embodiment of a first cover in a discharge cover assembly according to FIG. 1.

On the other hand, as shown in FIG. 6, when the first extension portion 161c is extended from an outer circumferential surface of the first fixed portion 161b, an heat radiation effect on the first cover 161 may be further enhanced. The first extension portion 161c may be bent on the first fixed portion 161b and formed in a direction parallel to an inner circumferential surface of the casing 110.

Then, to an extent that first extension portion 161c is extended, a heat radiation area of the first cover 161 is increased to improve a heat radiation effect on the first cover while heat quickly moves from the first cover 161 to the casing 110.

Moreover, a gap between an outer circumferential surface of the first cover 161 and an inner circumferential surface of the casing 110 is decreased by the first extension 161c, thereby increasing the convective heat transfer coefficient while a flow rate of refrigerant passing between the first cover 161 and the casing 110. Then, the first cover 161 may be quickly dissipated while increasing a heat transfer rate between the first cover 161 and the casing 110, thereby effectively preventing sucking loss or compression loss from occurring in the compression unit 140.

Figure 7:
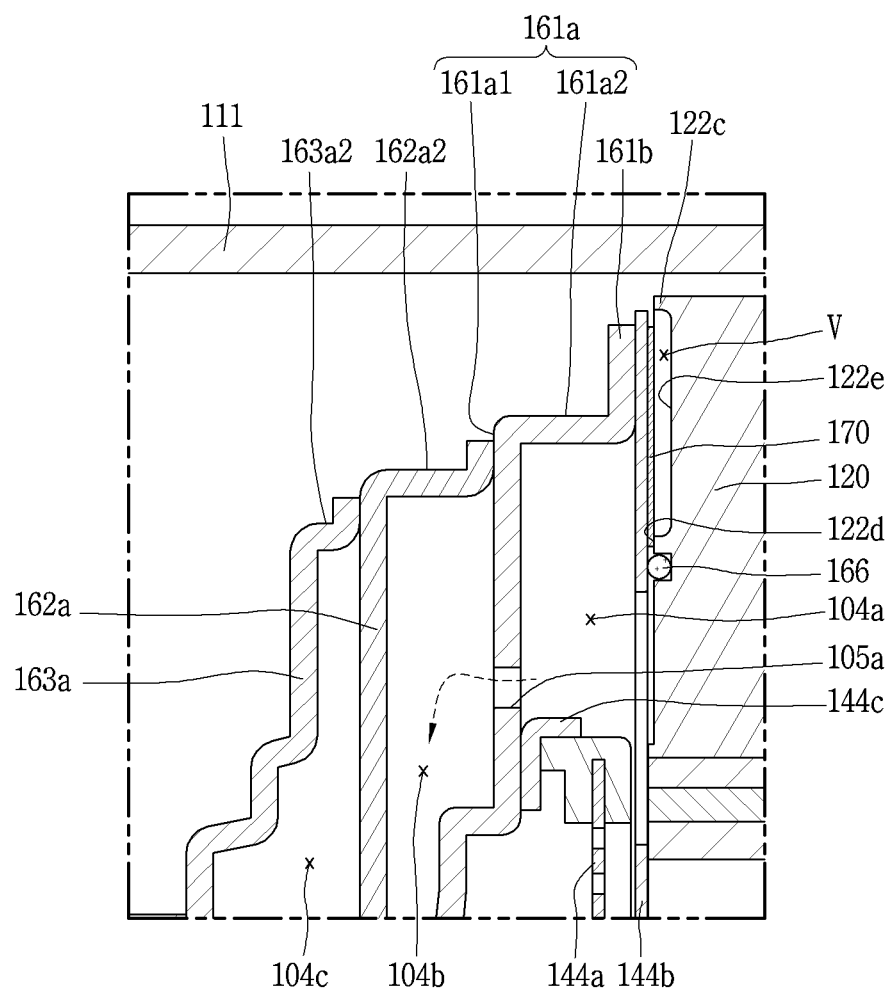
FIG. 7 is a longitudinal cross-sectional view showing another embodiment of a discharge cover assembly according to FIG. 1.

On the other hand, in the foregoing embodiment, the space portion of the first cover is formed to be exposed to the inner space of the casing in the discharge cover assembly, but all the space portions 161a, 162a, 163a of the discharge cover such as the first cover 161 as well as the second cover 162 or the third cover 162 may be formed to be exposed to the inner space 101 of the casing 110 as shown in FIG. 7.

For this purpose, the first space portion 161a is formed to be larger than the second space portion 162a, and the second space portion 162a is formed to be larger than the third space portion 163a, and thus the first fixed portion 161a may be bolt-assembled to the frame 120 while the second fixed portion 162b is welded and coupled to the first space portion 161a and the third fixed portion 163b is welded and coupled to the second space portion 162a. Accordingly, the sidewall portion 161a2 of the first space portion 161a and the sidewall portion 162a2 of the second space portion 162a and the sidewall portion 163a2 of the third space portion 163a may be respectively exposed to the inner space 101 of the casing 110.

Figure 8:
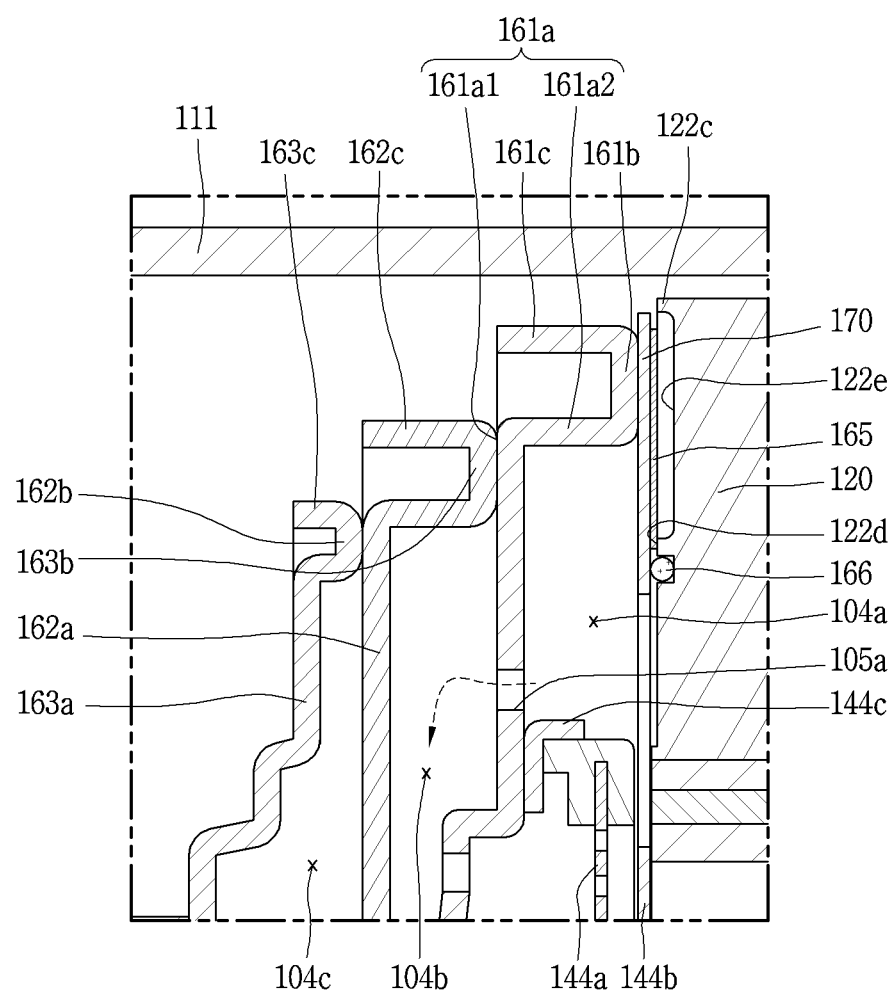
FIG. 8 is a perspective view showing another embodiment of each cover in the discharge cover assembly according to FIG. 7.

In this case as well, as shown in FIG. 8, each of the extension portions 161c, 162c, 163c may be further formed on the fixed portions 161b, 162b, 163b, respectively.

As described above, when the space portions 161a, 162a, 163a of the covers 161, 162, 163 are respectively exposed to the inner space 101 of the casing 110, a heat radiation effect on each of the covers 161, 162, 163 may be further improved, thereby improving a heat radiation effect on the entire discharge cover assembly 160. Then, the amount of heat transferred from the discharge cover assembly 160 to the frame 120 or the cylinder 141 may be reduced, thereby effectively preventing suction loss or compression loss in the compression unit 140.

Meanwhile, a heat insulating cover may be provided between a front side of the frame and the discharge cover assembly facing the front surface of the frame to block the heat of the discharge cover assembly from being transferred to the frame or the cylinder. Through this, sucked refrigerant or compressed refrigerant may be suppressed from being overheated, thereby preventing suction loss or compression loss from occurring in the compression unit.

Referring to FIGS. 1 through 4, the heat insulating cover 170 is provided between the front side 122b of the frame 120 and the first fixed portion 161b of the first cover 161, and bolt-fastened to the frame 120 together with the first cover 161. The heat insulating cover 170 may be formed of a material having a thermal conductivity lower than that of the first cover 161. Accordingly, the heat insulating cover 170 may suppress the first cover 161 from being directly brought into contact with the frame 120, thereby blocking heat contained by the first cover 161 from being transferred to the frame 120.

Here, the heat insulating cover 170 may be formed in an annular shape, and a radial width of the heat insulating cover 170 may be formed to be substantially the same as that of the first fixed portion 161b. Then, the heat insulating cover 170 may be located only between the frame 120 and the first fixed portion 161b to block the heat of the first cover 161 from being conducted to the frame 120 through the first fixed portion 161b.

However, as the first space portion 161a of the first cover 161 has an area accommodating a central portion of the front side 122b of the frame 120, when the heat insulating cover 170 is located only between the frame 120 and the first fixed portion 161b as described above, there may be a limit in blocking frame 120 and the cylinder 141 from being heated while the refrigerant of the first space portion 161a is directly brought into contact with the frame 120 and the front side 141b of the cylinder 141.

Accordingly, part of the heat insulating cover 170 according to the present embodiment may be disposed between the frame 120 and the first fixed portion 161b to block heat transfer due to conduction, while another part of the heat insulating cover 170 is located between the frame 120 and the cylinder and the first space portion 161a and the second space part 141a to block heat transfer due to the convection. Hereinafter, a portion located between the frame 120 and the first fixed portion 161b is referred to as a first heat insulating portion 171, and a portion located between the frame 120 and the cylinder 141 and the first space portion 161a is referred to as a second heat insulating portion 172. The first heat insulating portion 171 is formed on an outer portion of the heat insulating cover 170, and the second heat insulating portion 172 is formed on an inner portion of the heat insulating cover 170.

An outer protrusion portion 122c and an inner protrusion portion 122d may be formed on the front side 122b of the frame 120, and a spacing groove 122e recessed by a predetermined depth may be formed between the outer protrusion portion 122c and the inner protrusion portion 122d. The spacing groove 122e may be covered with the above-described heat insulating cover 170 to form a type of heat insulating space portion (V).

Here, the spacing groove 122e constituting the heat insulating space portion (V) is sealed by a space portion sealing member 166 provided between the heat insulating cover 170 and the inner protrusion portion 122d and separated from the first discharge space 104a. Accordingly, even when the spacing groove 122e is communicated with the inner space 101 of the casing 110 to fill the refrigerant at a suction pressure therein, it may be possible to prevent the refrigerant in the first discharge space 104a from leaking into the spacing groove 122e.

In addition, the spacing groove 122e may be formed with a bearing inlet groove 125a forming an inlet of the gas bearing. Since the bearing inlet groove 125a is covered by the heat insulating cover 170, the gas through hole 170c may be formed between an outer circumferential surface 170a and an inner circumferential surface 170b of the heat insulating cover 170. Furthermore, a bearing sealing member 167 is provided to surround the bearing inlet groove 125a to seal between the bearing inlet groove 125a and the spacing groove 122e.

As described above, when relatively cool refrigerant flows into the heat insulating space portion (V) in the inner space 101 of the casing 110, it may be possible to effectively suppress the frame 120 and the cylinder 141 from being heated while heat being transferred from the first discharge space 104a toward the frame 120 or the cylinder 141 is more effectively blocked.

Figure 9:
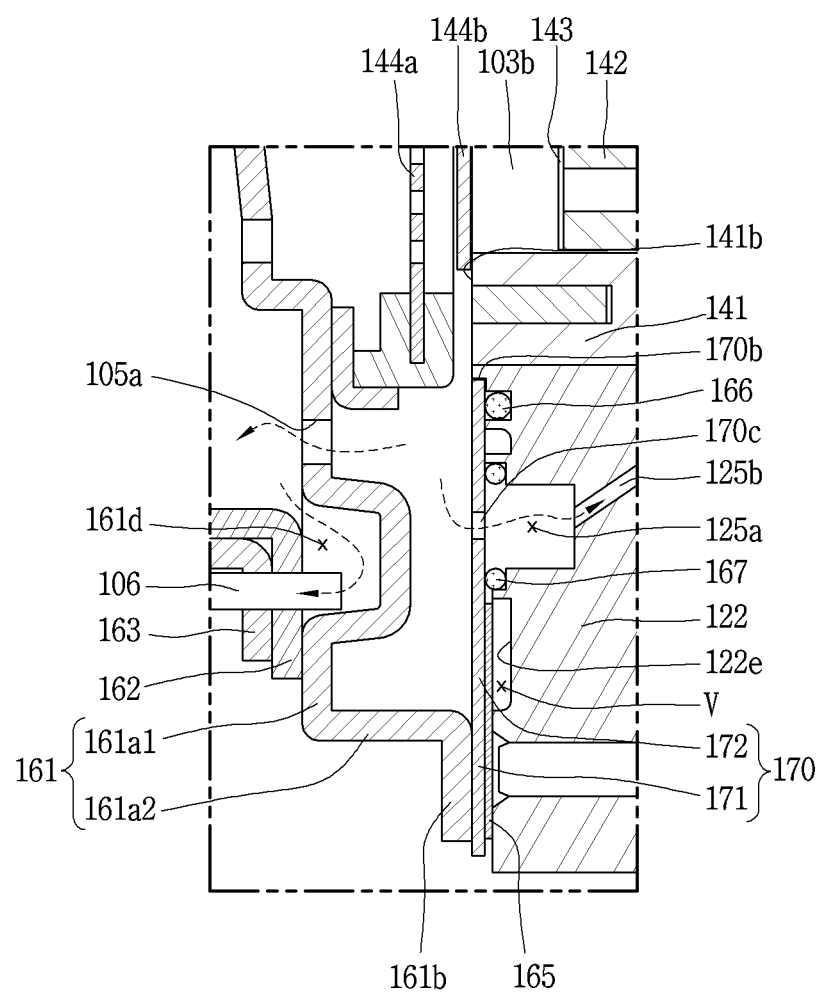
FIGS. 9 and 10 are longitudinal cross-sectional views showing embodiments in which a heat insulating cover is assembled in FIG. 1.
Figure 10:
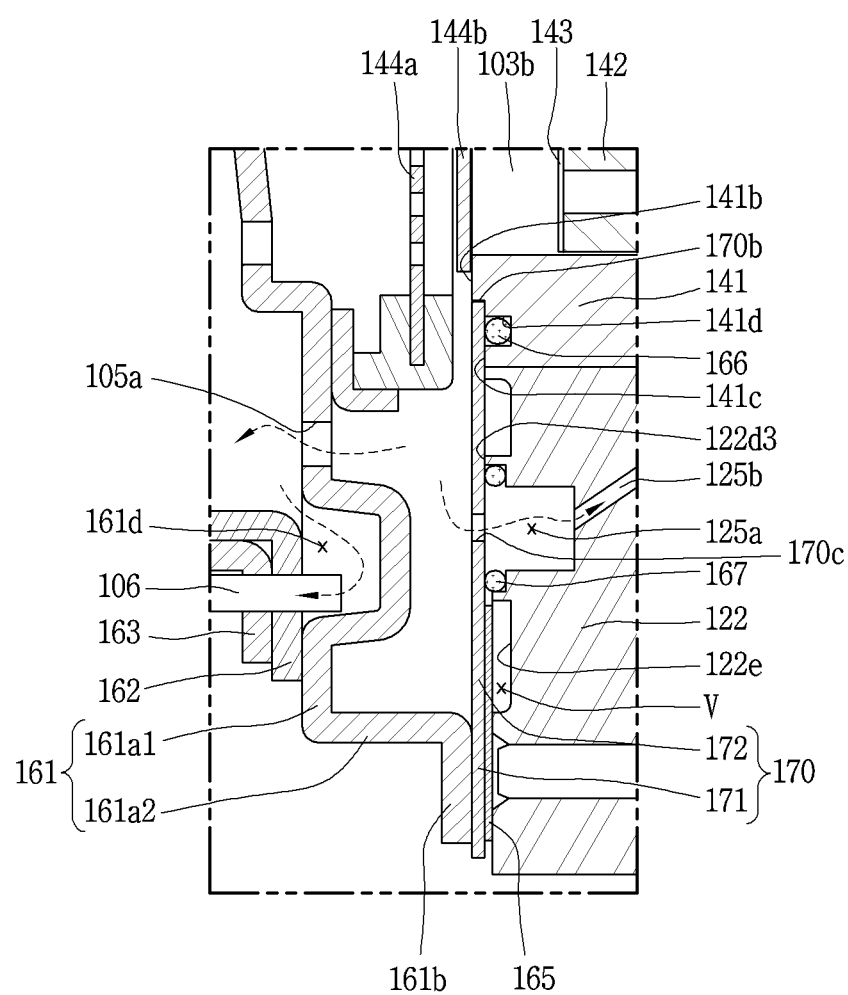

On the other hand, the heat insulating cover 170 may cover the front side 122b of the frame 120 as shown in FIG. 9, but also may cover part or whole of the front side 141b of the cylinder 141 beyond the frame 120 as shown in FIG. 10. When the heat insulating cover 170 covers the front side 141b of the cylinder 141, it may be possible to block the refrigerant of the first discharge space 104a from being in contact with the cylinder 141 as well as the frame 120, thereby more effectively preventing the frame 120 and the cylinder 141 from being overheated by the refrigerant of the first discharge space 104a.

As a result, it may be possible to suppress refrigerant in the suction flow path or the compression space from being overheated while the temperature of the frame is maintained at about 60° C. or lower, thereby reducing the suction loss and the compression loss of the refrigerant to improve the efficiency of the compressor.

Meanwhile, another embodiment of the linear compressor according to the present disclosure will be described as follows.

In other words, in the above-described embodiments, at least a portion of the discharge cover in contact with the compression unit, that is, the first cover, among a plurality of discharge covers, is exposed to the inner space of the casing to quickly dissipate the heat of the refrigerant discharged to the first discharge space. However, also in this case, when refrigerant accommodated in the first discharge space is supplied to the gas bearing, the temperature of refrigerant flowing into a gap between the cylinder and the piston is increased. Then, the cylinder and the piston may be heated by the refrigerant and refrigerant sucked into the compression space or refrigerant compressed in the compression space is overheated, and when refrigerant in the compression space is overheated, a specific volume of refrigerant being sucked may be increased to generate suction loss or compression loss.

Figure 11:
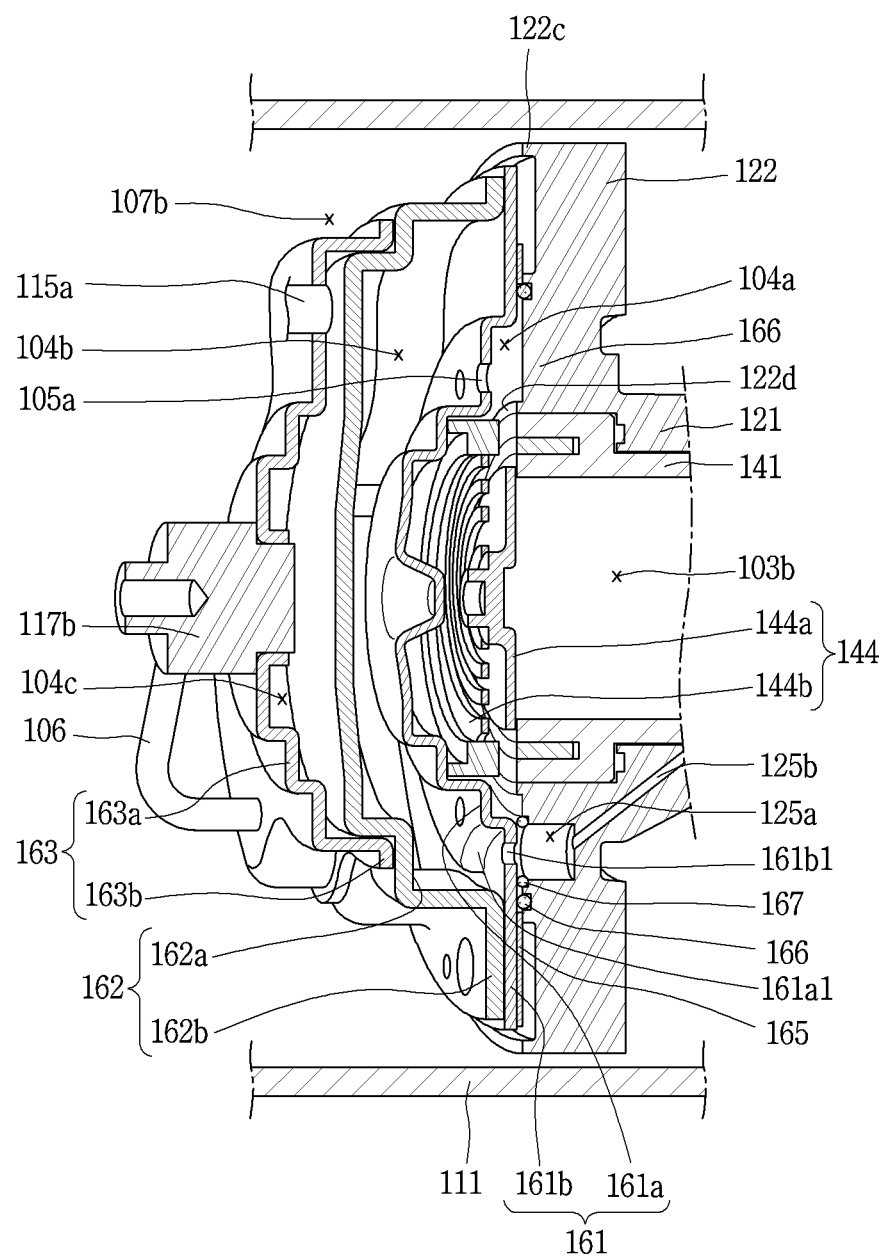
FIG. 11 is a broken perspective view showing another embodiment of a discharge cover assembly in a linear compressor according to the present disclosure.
Figure 13:
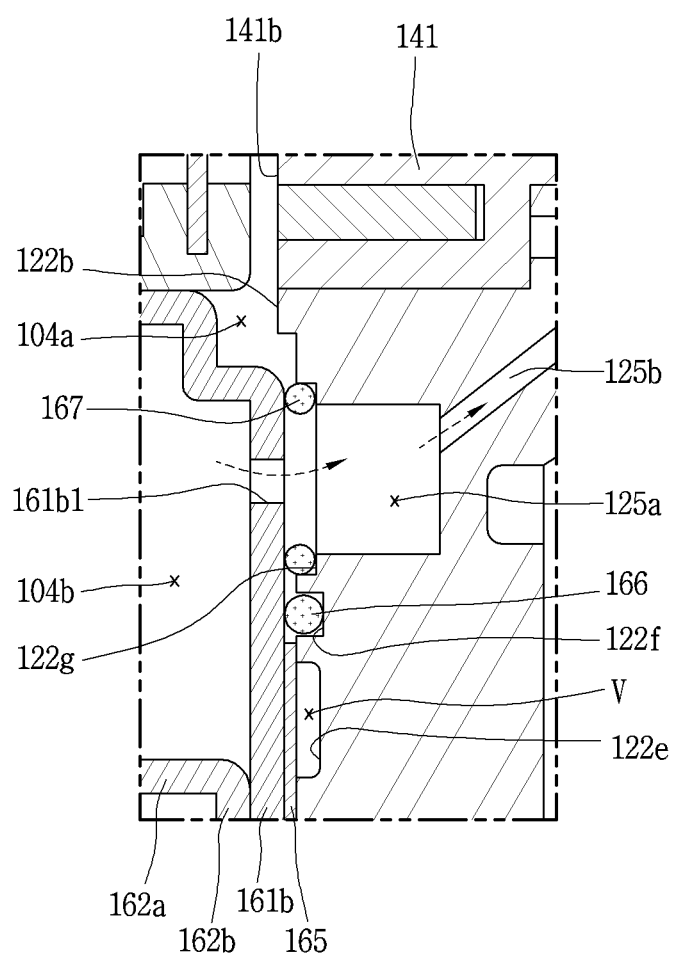
FIG. 13 is a longitudinal cross-sectional view showing an enlarged view around an inlet groove in FIG. 12.
Figure 14:
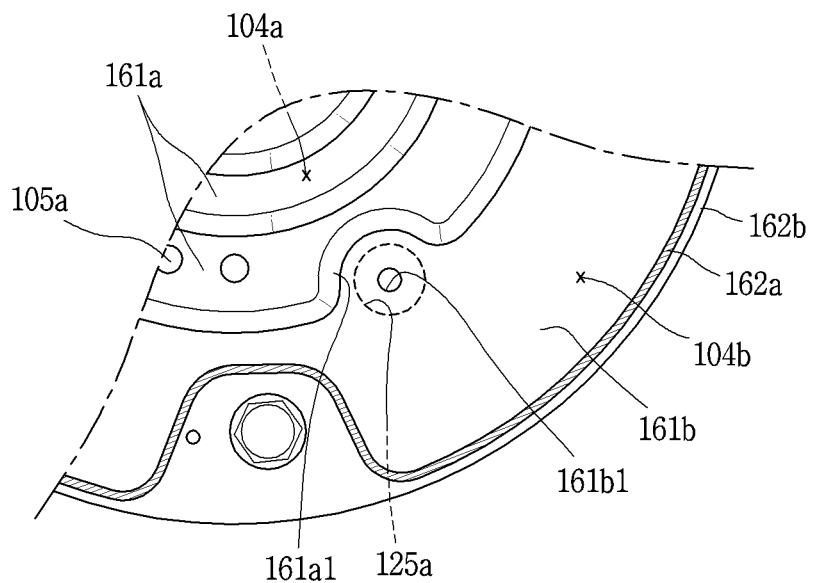
FIGS. 14 and 15 are plan views showing embodiments in which a bearing inlet groove is communicated with a second space portion in FIG. 13.
Figure 15:
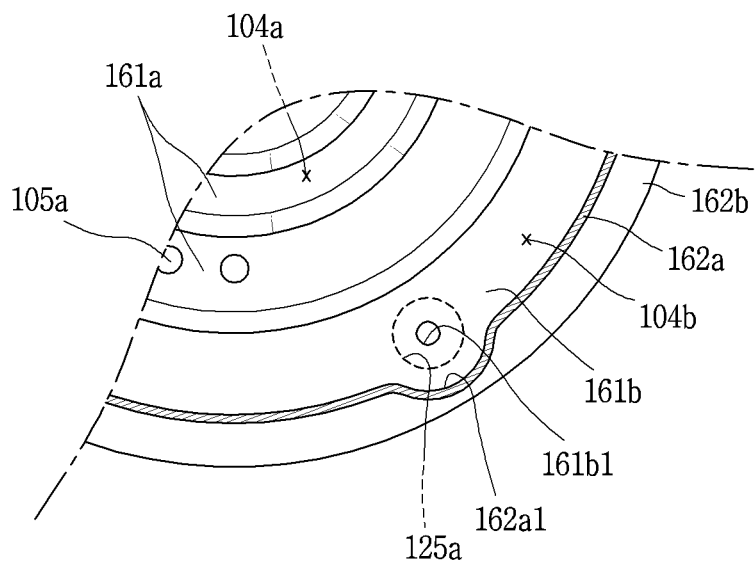

Thus, the bearing inlet groove may be communicated with the discharge space having a lower refrigerant temperature than the first discharge space, for example, the second discharge space. FIG. 11 is a broken perspective view showing another embodiment of a discharge cover assembly in a linear compressor according to the present disclosure, FIG. 12 is an assembled longitudinal cross-sectional view showing a discharge cover assembly according to FIG. 11, FIG. 13 is a longitudinal cross-sectional view showing an enlarged view around an inlet groove in FIG. 12, and FIGS. 14 and 15 are plan views showing embodiments in which a bearing inlet groove is communicated with a second space portion in FIG. 13.

Figure 12:
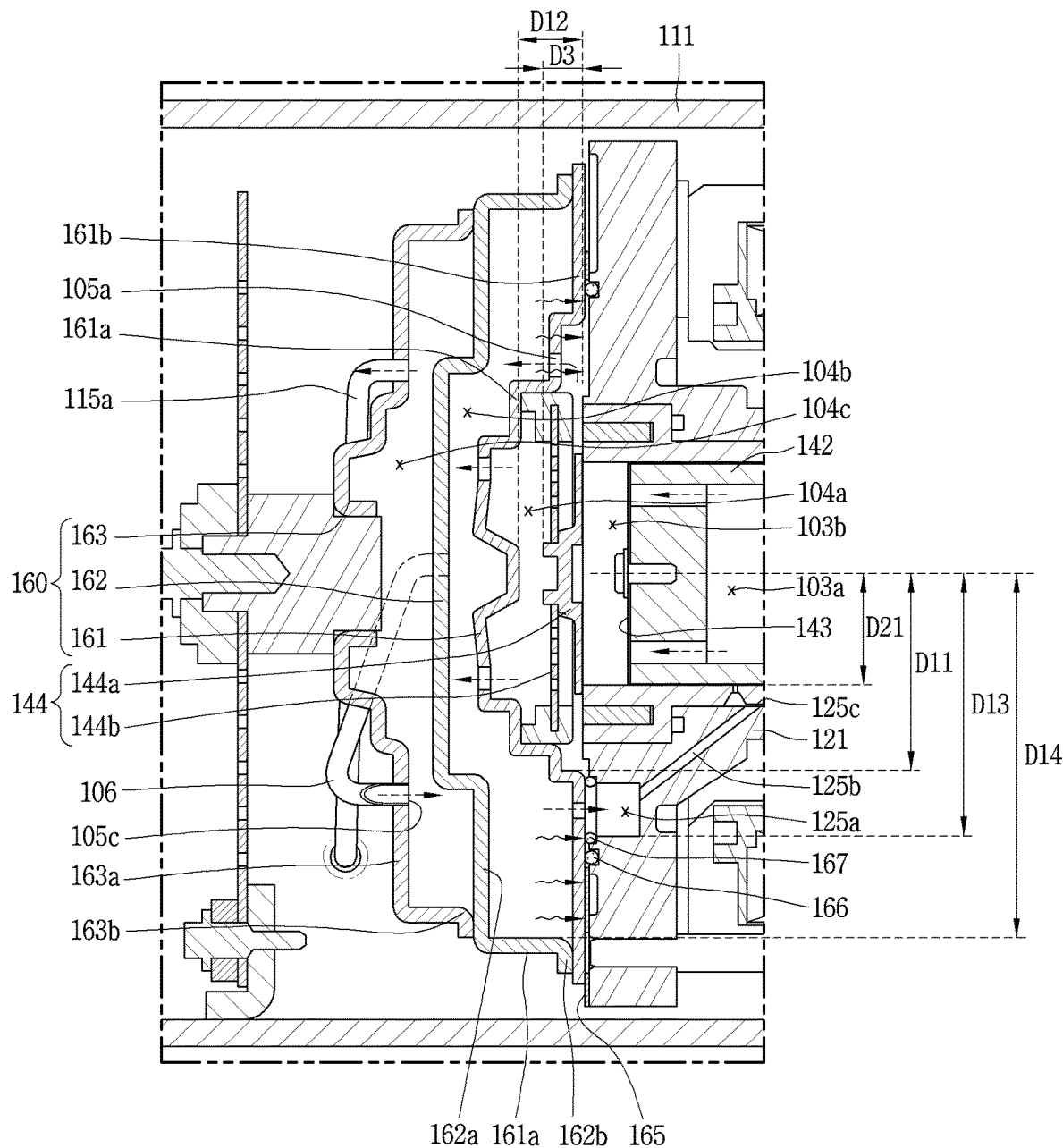
FIG. 12 is an assembled longitudinal cross-sectional view showing a discharge cover assembly according to FIG. 11.

Referring to FIGS. 11 and 12, the bearing inlet groove 125a according to the present embodiment may be communicated with the second space portion 104b of the second cover.

Here, with respect to the center of the piston 142, a distance (D11) to an inner circumferential surface of the first space portion 161a may be formed to be larger than a distance (D21) to the inner circumferential surface of the cylinder 141, but may be formed to be smaller than a distance (D13) to an outer side inner circumferential surface of the bearing inlet groove 125a. Accordingly, as shown in FIG. 13, the inlet groove 125a of the bearing may be located at an inside of the second space portion 162a constituting the second discharge space 104b at an outside of the first space portion 161a constituting the first discharge space 104a.

However, when the distance (D11) to the inner circumferential surface of the first space portion 161a is smaller than the distance (D13) to the outer side inner circumferential surface of the bearing inlet groove 125a, a side surface of the first space portion 161a may be formed in a circular shape, but when the distance (D11) to the inner circumferential surface of the first space portion 161a is formed to be greater than or equal to the distance (D13) to the outer side inner circumferential surface of the bearing inlet groove 125a, a side surface of the first space portion 161a may be formed in a non-circular shape.

For example, when the distance (D11) to the inner circumferential surface of the first space portion 161a is larger than the distance D13 to the outer side inner circumferential surface of the bearing inlet groove 125a as shown in FIG. 14, a concave portion 161a1 may be formed such that a portion of the side surface of the first space portion 161a facing the bearing inlet groove 125a is depressed toward the center, and the bearing inlet groove 125a is located at an outside of the concave portion 161a1, thereby excluding the bearing inlet groove 125a from the first discharge space 104a.

Accordingly, the bearing inlet groove 125a is located outside the first space portion 161a not to communicate with the first discharge space 104a, and instead, located inside the second space portion 162a to communicate with the second discharge space 104b. Then, as shown in FIGS. 11 through 13, for refrigerant introduced into the bearing inlet groove 125a, refrigerant discharged from the compression chamber 103b is not immediately introduced into the first discharge space 104a, but refrigerant moved to the second discharge space 104b through the first discharge space 104a is introduced from the second discharge space 104b.

Here, the side surface of the second space 162a may be formed in a circular shape or may be formed in a non-circular shape in some cases. However, when the side surface of the second space portion 162a is formed in a circular shape, an inner diameter of the second space portion 162a should be formed to be larger than the outer diameter (D13) of the bearing inlet groove 125a, but when the side surface of the second space portion 162a is formed in a non-circular shape, the distance (D14) to the inner circumferential surface of the second space portion 162a may be formed to be smaller than the distance (D13) to the outer side inner circumferential surface of the bearing inlet groove 125a.

As shown in FIG. 15, when the side surface of the second space portion 162a is formed in a non-circular shape, a convex portion 162a1 extended outwardly enough to accommodate the bearing inlet groove 125a may be formed. As a result, the second space portion 162a may be communicated with the first space portion 161a through the first communicating hole 105a while at the same time being communicated with the bearing inlet groove 125a through a first gas through hole 161b1 which will be described later.

Furthermore, the first space portion 161a may be bent in a single step from a first fixed portion 161b, which will be described later, and convexly formed forward. However, the first space portion 161a may be bent in two or more steps to form a plurality of step surfaces S1, S2.

For example, the first space portion 161a is formed with a first step surface (S1) and a second step surface (S2) in the order close to the frame, and the foregoing first communicating hole 105a may be formed on the first step surface (S1) while the discharge valve assembly is inserted into the second step surface (S2) to be supported in an axial direction.

Accordingly, the first communicating hole 105a may be disposed closer to the cylinder 141 than the valve spring 144b to reduce a flow path resistance to refrigerant discharged from the compression space 103b to the first discharge space 104a. As a result, the refrigerant discharged into the first discharge space 104a may be quickly moved to the second discharge space 104b through the first communicating hole 105a.

Here, the discharge valve assembly 144 fixed to the second step surface (S2) is elastically supported by the valve spring 144b formed with a plate spring to open or close the compression unit 103b of the cylinder 141 while moving in an axial direction. Therefore, the depth (D12) of the first discharge space 104a is preferably formed to be at least larger than the thickness (D3) of the discharge valve 144a.

On the other hand, the first cover 161 may be further formed with a first fixed portion 161b extended from an edge of the first space portion 161a, the second cover 162 with a second fixed portion 161b extended from an edge of the second space portion 162a, and the third cover 163 with a third fixed portion 163b extended from an edge of the third space portion 163a, respectively. Thus, the first cover 161 is coupled to the frame 120 by the first fixed portion 161b, and the second cover 162 is coupled to the first cover 161 by the second fixed portion 162b, and the third cover 163 may be coupled to the second cover 162 by the third fixed portion 163b.

Here, each of the space portions 161a, 162a, 163a may be convexly formed so as to have the discharge spaces 104a, 104b, 104c, respectively, while each of the fixed portions 161b, 162b, 163b is extended in a radial direction from the each of the space portions 161a, 162a, 163 and formed in a flange shape so as to be closely brought into contact with and fixed to the front side of the flange portion 122 of the frame 120.

The first fixed portion 161b and the second fixed portion 162b may be formed to have a large area and bolt-fastened to the flange portion 122 of the frame 120 by the same bolts in a state of being overlapped with each other, and the third fixed portion 163b may be formed to have a smaller area compared to the first and second fixed portions 161b, 162b and welded or adhered to the front side of the second cover 162.

On the other hand, as shown in FIGS. 12 and 13, a gasket 165 for heat insulation is provided between the first fixed portion 161b and the frame 120, and a first sealing member 166 for suppressing the refrigerant of the second discharge space 104b from leaking may be provided at an inner side of the gasket 165. The gasket 165 may be formed of a material having a lower thermal conductivity than the first cover 161, and an O-ring formed of a material having a low thermal conductivity such as rubber may be applied to the first sealing member 166.

Furthermore, as described above, since the first space portion 161a is located at an inner side of the bearing inlet groove 125a, the first fixed portion 161b may cover the bearing inlet groove 125a and extend in a radial direction. Therefore, the first fixed portion 162b is formed with the first gas through hole 161b1 passing through a position facing the bearing inlet groove 125a to allow the second discharge space 162a to communicate with the bearing inlet groove 125a. At this time, the refrigerant of the second discharge space 162a may be leaked between the first cover 161 and the frame 120 during the process of flowing into the bearing inlet groove 125a, and thus a second sealing member 167 such as an O-ring may be provided around the bearing inlet groove 125a.

The operational effect of the foregoing linear compressor according to this embodiment is as follows.

As described above, when the gas bearing is applied, when refrigerant at a high temperature flows into a gap between the cylinder 141 and the piston 142, the temperature of the compression unit further rises, thereby further increasing the temperature rise of the refrigerant described above. Therefore, when refrigerant discharged from the compression space 103b among the respective covers constituting the discharge cover assembly 160 flows into the gas bearing from the discharge space 104a of the first cover 161 in which the refrigerant is first accommodated, the refrigerant in a high temperature state may be immediately supplied between the cylinder 141 and the piston 142 to further increase the temperature of the cylinder 141 and the piston 142.

However, as in the present embodiment, when the refrigerant of the second discharge space 104b at a relatively lower temperature compared to the refrigerant of the first discharge space 104a is supplied to the gas bearing, it may be possible to suppress the temperature of the cylinder and the piston from being excessively heated. In other words, refrigerant flowing into the first discharge space 104a is reduced to approximately 60° C. since the first cover 161 is dissipated by low-temperature refrigerant filled in the inner space 101 of the casing 110, and heat transferred from the discharge cover assembly 160 to the compression unit is reduced as the refrigerant moves to the second discharge space 104b to be supplied to the gas bearing. Through this, sucked refrigerant or compressed refrigerant may be suppressed from being overheated, thereby preventing suction loss or compression loss from occurring in the compression unit in advance.

Meanwhile, another embodiment of the linear compressor according to the present disclosure will be described as follows.

In other words, in the above-described embodiment, a gasket is provided between the first fixed portion and the front side of the frame to insulate part of an area where the first fixed portion and the frame come into contact with each other, but heat transfer due to conduction may be increased as the first fixed portion and the frame are directly brought into contact with each other at a portion where the gasket is unable to reach. In addition, the front side of the frame or the front side of the cylinder may be exposed to the first discharge space, thereby further increasing the temperature of the frame and the cylinder as the refrigerant of the first discharge space is brought into contact with the frame or the cylinder.

Thus, in the present embodiment, the above-described heat insulating cover may be provided between the first fixed portion and the front side of the frame to block the heat of the first fixed portion from being conducted to the frame or block the refrigerant of the first discharge space from being brought into contact with the frame or the cylinder so as to suppress the frame and the cylinder from being heated.

Figure 16:
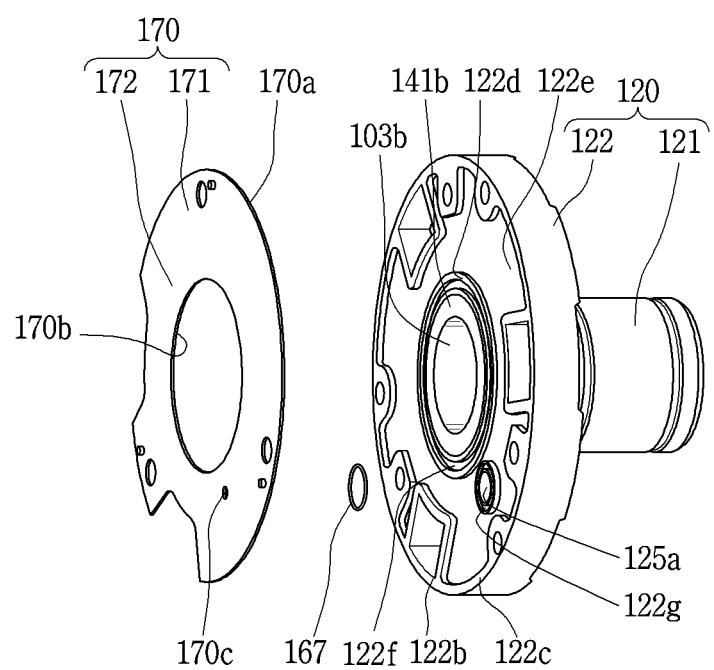
FIG. 16 is an exploded perspective view showing part of an embodiment in which a heat insulating cover is included in the linear compressor according to FIG. 11.
Figure 17:
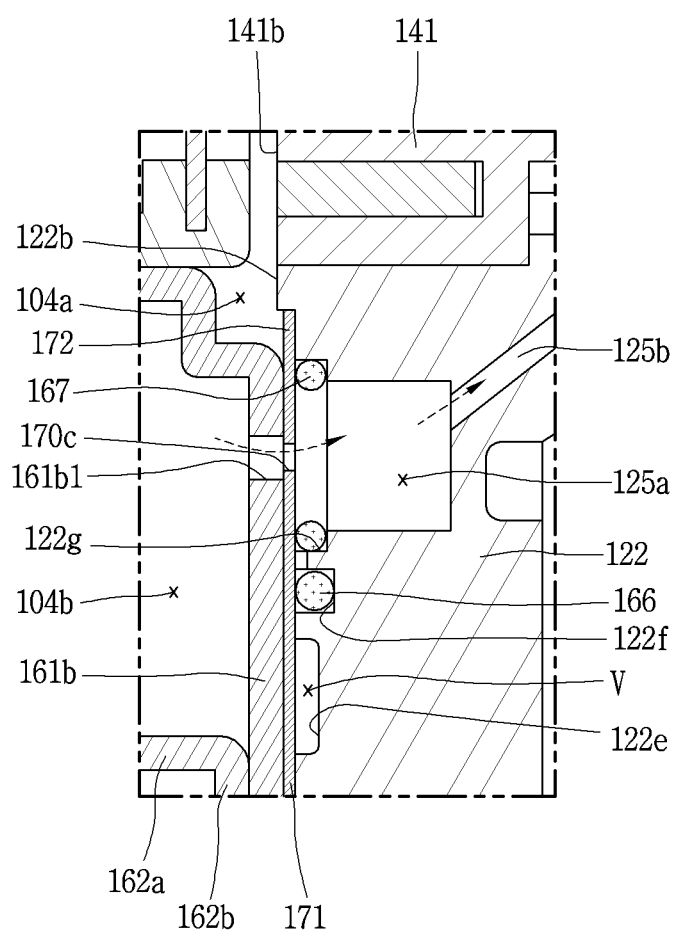
FIG. 17 is an assembled longitudinal cross-sectional view showing part of an embodiment according to FIG. 16.

FIG. 16 is an exploded perspective view showing part of an embodiment in which a heat insulating cover is included in the linear compressor according to FIG. 11, and FIG. 17 is an assembled longitudinal cross-sectional view showing part of an embodiment according to FIG. 16. The heat insulating cover according to the present embodiment may be formed and assembled in a substantially similar manner to the heat insulating cover in another embodiment described above.

For example, as shown in FIGS. 16 and 17, the heat insulating cover 170 according to the present embodiment includes a first heat insulating portion 170 constituting an outer portion, which is located between the frame 120 and the first fixed portion 161b, and a second heat insulating portion 172 constituting an inner portion, which is located between the frame 120 and the cylinder 141 and the first space portion 161a.

The first heat insulating portion 171 is partially placed and supported on the outer protrusion portion 122c provided on the front side 122b of the frame 120 while the second heat insulating portion 172 is closely adhered to and supported on the first sealing member 166 provided on the front side 122b of the frame 120 in a state of being separated from the front side 122b of the frame 120.

Here, the spacing groove 122e recessed by a predetermined depth to form a type of heat insulating space portion (V) may be formed between the outer protrusion portion 122c and the inner protrusion portion 122d, and the spacing groove 122e may communicate with the inner space of the casing as a gap between the spacing groove 122e and the outer protrusion portion 122c is open. Accordingly, refrigerant at a relatively low temperature with a suction pressure is filled into the spacing groove 122e constituting the heat insulating space portion (V).

The second heat insulating portion 172 of the heat insulating cover 170 may be placed on and supported by the inner protrusion portion 122d. Accordingly, the front side 122b of the frame 120 is covered with the heat insulating cover 170 to form the foregoing heat insulating space portion (V) between the spacing groove 122e of the frame 120 and the rear side of the heat insulating cover 170.

Furthermore, a first sealing member insertion groove 122f provided between the inner protrusion portion 122d and the rear side of the heat insulating cover (V) to insert the first sealing member 166 for sealing between the first discharge space 104a and the heat insulating space portion (V) may be formed on the inner protrusion portion 122d.

The first sealing member 166 is closely brought into contact with an inner rear surface of the heat insulating cover 170 so that the spacing groove 122e is separated from the first discharge space 104a formed in the first space portion 161a of the first cover 161 as well as from the compression space 103b formed inside the cylinder 141, thereby maintaining the sealing state.

Meanwhile, the bearing inlet groove 125a described above may be formed inside the spacing groove 122e. For the bearing inlet groove 125a, as the bearing inlet groove 125a is communicated with the second discharge space 104b, the second sealing member insertion groove 122g may be formed to surround the bearing inlet groove 125a, and the second sealing member 167 may be inserted into the second sealing member 167.

A second gas through hole 170 may be formed between an outer circumferential surface 170a and an inner circumferential surface 170b of the second heat insulating portion 172 to flow the refrigerant in the second discharge space 104b into the bearing inlet groove 125a, and the second gas through hole 170 may be formed coaxially with the first gas through hole 161b1.

For the heat insulating cover 170 according to the present embodiment, the first heat insulating portion 171 is located between the frame 120 and the first fixed portion 161b to block the heat of the first fixed portion 161b from being transferred to the frame 120 by heat conduction. In addition, the second heat insulating portion 172 is located between the frame 120 and the cylinder 141 and the first space part 161a to block the temperature of refrigerant accommodated in the first space portion 161a from being transferred to the frame 120 due to convection.

In other words, when the first heat insulating portion 171 of the heat insulating cover 170 made of a material having a low thermal conductivity is located between the first fixed portion 161b and the front side 122b of the frame 120, it may be possible to block heat from being conducted in the direction of the frame 120 from the first cover 161, thereby suppressing the frame 120 from being heated.

In addition, as the second heat insulating portion 172 of the heat insulating cover 170 is located between the first space portion 161a and the front side 122b of the frame 120 and the front surface 141b of the cylinder 141, it is blocked between the first discharge space 104a constituting an inside of the first space portion 161a and the front side 122b of the frame 120 and the front side 141b of the cylinder 141. Then, the refrigerant of the first discharge space 104a may not be able to be directly brought into contact with the frame 120 or the cylinder 141, thereby suppressing the frame 120 or the cylinder 141 from being heated directly by the refrigerant of the first cover 161.

Moreover, the heat insulating space portion (V) formed with the spacing groove 122e is formed between the second heat insulating portion 172 of the heat insulating cover 170 and the front side 122b of the frame 120, and relatively cold refrigerant flows into the heat insulating space portion (V) in the inner space 101 of the casing 110. Accordingly, heat toward the frame 120 or the cylinder 141 in the first discharge space 104a may be blocked in the heat insulating space portion (V), thereby more effectively suppressing the frame 120 or the cylinder 141 from being heated.

As a result, it may be possible to suppress refrigerant in the suction flow path or the compression space from being overheated while the temperature of the frame is maintained at about 60° C. or lower, thereby reducing the suction loss and the compression loss of the refrigerant to improve the efficiency of the compressor.

Figure 18:
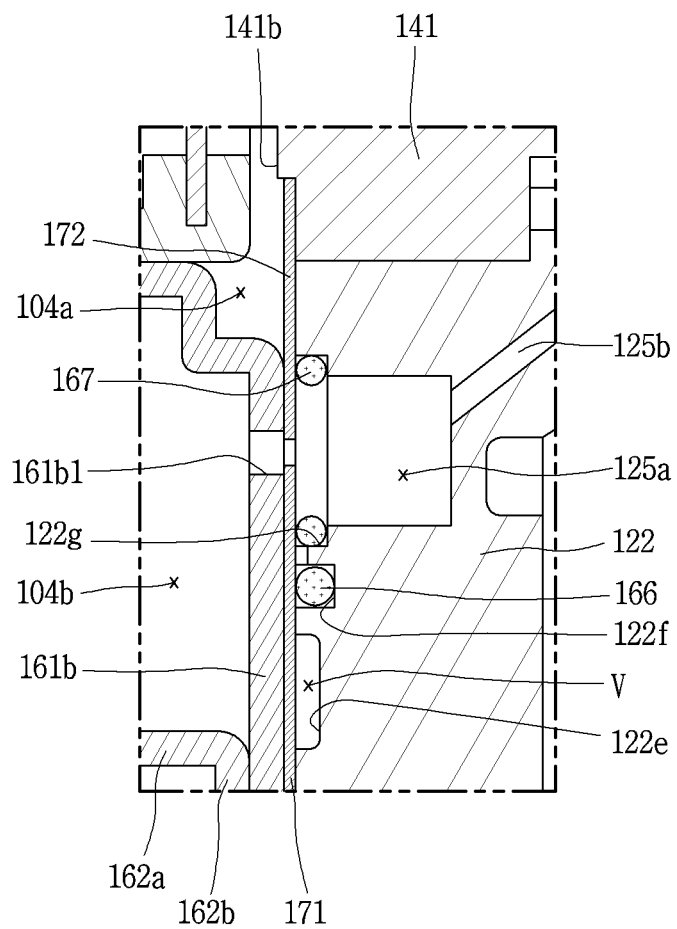
FIG. 18 is a longitudinal cross-sectional view showing another embodiment of a heat insulating cover in FIG. 13.

On the other hand, the second heat insulating portion of the heat insulating cover according to the present embodiment may be formed to cover part of the cylinder beyond the frame. FIG. 18 is a longitudinal cross-sectional view showing another embodiment of a heat insulating cover in FIG. 13.

As shown in the drawing, in the present embodiment, as the heat insulating cover 170 completely covers the front side 122b of the frame 120, it may be possible to block the refrigerant of the first discharge space 104a from being directly brought into contact with the frame 120. In addition, as the heat insulating cover 170 covers part of the front side 141b of the cylinder 141, an area of the cylinder 141 being directly brought into contact with the refrigerant of the first discharge space 104a is also reduced.

As a result, an area of the frame 120 and the cylinder 141 being heated by the refrigerant may be reduced to suppress the refrigerant of the compression space and the suction space from being overheated, thereby enhancing the efficiency of the compressor.

On the other hand, in the above-described embodiments, the bearing inlet groove communicating with the discharge space of the second cover has been described as an example, but, in some cases, the bearing inlet groove may communicate with the discharge space of the third cover. In this case, the third cover may be formed to have an area capable of accommodating both the first cover and the second cover, but in some cases, the third cover may be formed to be smaller than the first cover and the second cover and connected to the bearing inlet groove using the connection pipe.

Besides, although the above embodiments have been described with reference to an example in which a compressor body including a compression unit is installed inside a casing having a closed inner space, the present disclosure may also be applicable in the same manner to a case where the casing is excluded and the compressor body is supported and exposed to the housing.

What is claimed is:

1. A linear compressor, comprising:
   a linear motor comprising a mover configured to reciprocate with respect to a stator;
   a compression unit comprising a (i) cylinder and (ii) a piston that is connected to the mover and that is configured to reciprocate within the cylinder, wherein the cylinder defines a compression space therein in which a refrigerant is compressed based on reciprocation of the piston within the cylinder;
   a plurality of discharge covers that define a plurality of discharge spaces configured to accommodate the refrigerant that is discharged from the compression space, the plurality of discharge spaces configured to communicate with each other; and
   a gas bearing configured to guide a portion of the refrigerant from at least one discharge space, among the plurality of discharge spaces, into a region between the cylinder and the piston to lubricate friction between the piston and the cylinder,
   wherein the plurality of discharge covers comprises a first discharge cover that is configured to contact the compression unit and that defines a first discharge space among the plurality of discharge spaces, and a second discharge cover that defines a second discharge space among the plurality of discharge spaces, the second discharge space being configured to receive refrigerant from the first discharge space, wherein the gas bearing includes an inlet disposed outside of the first discharge space and covered by the second discharge cover, the inlet being separate from the first discharge space and in communication with the second discharge space, wherein the first discharge cover or the second discharge cover comprises a side wall having a non-circular cross-section, the side wall surrounding the first discharge space or the second discharge space, and wherein a portion of the side wall that faces the inlet of the gas bearing is recessed in a radial direction of the cylinder.

2. The linear compressor of claim 1, wherein the at least one discharge space, from which the portion of the refrigerant is guided by the gas bearing into the region between the cylinder and the piston, comprises the second discharge space.

3. The linear compressor of claim 2, wherein the first discharge space is configured to receive refrigerant that is discharged from the compression space, and wherein the inlet is configured to receive the portion of the refrigerant from the second discharge space and to provide the received refrigerant into the region between the cylinder and the piston.

4. The linear compressor of claim 2, wherein the second discharge cover comprises a convex portion that defines the portion of the side wall, that faces the inlet of the gas bearing, and that protrudes from the side wall of the second discharge cover the convex portion being disposed outside of the inlet of the gas bearing in the radial direction to accommodate a portion of the inlet of the gas bearing.

5. The linear compressor of claim 2, wherein the first discharge cover defines a concave portion that is recessed in a radial direction of the cylinder and that does not overlap with an inlet of the gas bearing.

6. The linear compressor of claim 2, wherein the first discharge cover comprises a fixed portion configured to cover the inlet of the gas bearing and to contact and couple to the compression unit, the second discharge cover being coupled to the fixed portion of the first discharge cover, and wherein the fixed portion defines a first through-hole that allows communication between the second discharge space and the inlet of the gas bearing.

7. The linear compressor of claim 6, further comprising a heat insulating member that is located between the first discharge cover and the compression unit and that is configured to reduce heat transfer from the first discharge cover to the compression unit, wherein the heat insulating member overlaps with the fixed portion, and defines a second through-hole that is configured to communicate with the first through-hole and that allows communication between the second discharge space and the inlet of the gas bearing.

8. The linear compressor of claim 7, further comprising a sealing member configured to surround the inlet of the gas bearing, and to contact the heat insulating member or the fixed portion.

9. The linear compressor of claim 1, wherein the first discharge space is defined by the first discharge cover and the compression unit.

10. The linear compressor of claim 9, wherein the second discharge space is defined by the first discharge cover and the second discharge cover.

11. The linear compressor of claim 1, wherein the plurality of discharge covers comprises a third discharge cover that defines a third discharge space between the second discharge cover and the third discharge cover, the third discharge cover having an inner sidewall configured to contact an outer sidewall of the second discharge cover.

12. The linear compressor of claim 11, wherein the second discharge cover extends radially outward of the third discharge cover, and wherein the first discharge cover extends radially outward of the second discharge cover.

13. The linear compressor of claim 1, wherein at least a part of a sidewall portion of the first discharge cover is exposed to the outside of the second discharge space.

14. The linear compressor of claim 13, wherein the first discharge space is configured to communicate with the second discharge space, wherein the second discharge cover is configured to contact and couple with a front portion the first discharge cover, and wherein the front portion and the sidewall portion of the first discharge cover define the first discharge space.

15. The linear compressor of claim 14, wherein at least a part of the front portion of the first discharge cover is exposed to the outside of the second discharge cover.

16. The linear compressor of claim 1, wherein at least one of the plurality of discharge covers comprises:

a contact portion configured to contact and couple with a part of the linear compressor, and a heat radiating portion that extends from the contact portion to an outside of the contact portion, the heating radiating portion having a shape bent from the contact portion.

17. The linear compressor of claim 1, further comprising a heat insulating member located between the first discharge cover and the compression unit, wherein a thermal conductivity of the heating insulation member is less than a thermal conductivity of the first discharge cover, and wherein at least a part of the heat insulating member faces the first discharge space.

18. The linear compressor of claim 1, wherein the first discharge cover comprises a first space portion that defines the first discharge space, and a first fixed portion that extends from the first space portion in a radial direction and that covers the inlet of the gas bearing, and wherein the second discharge cover comprises a second space portion that defines the second discharge space between the first discharge cover and the second discharge cover, and a second fixed portion that extends from the second space portion in the radial direction and that is coupled to the first fixed portion.

19. The linear compressor of claim 18, wherein the first fixed portion defines a first-through hole in communication with the second discharge space and the inlet of the gas bearing, and wherein the second space portion includes the side wall, and the side wall includes a convex portion the defines the portion of the side wall, that is recessed outwardly from the side wall in the radial direction, and that is disposed outside of the inlet of the gas bearing in the radial direction.

20. The linear compressor of claim 1, wherein a distance from a center of the cylinder to the portion of the side wall in the radial direction is less than a distance from the center of the cylinder to the inlet of the gas bearing in the radial direction.

21. A linear compressor of comprising:
- a linear motor comprising a mover configured to reciprocate with respect to a stator;
- a compression unit comprising a (i) cylinder and (ii) a piston that is connected to the mover and that is configured to reciprocate within the cylinder, wherein the cylinder defines a compression space therein in which a refrigerant is compressed based on reciprocation of the piston within the cylinder;
- a plurality of discharge covers that define a plurality of discharge spaces configured to accommodate the refrigerant that is discharged from the compression space, the plurality of discharge spaces configured to communicate with each other; and
- a gas bearing configured to guide a portion of the refrigerant from at least one discharge space, among the plurality of discharge spaces, into a region between the cylinder and the piston to lubricate friction between the piston and the cylinder,
- wherein the plurality of discharge covers comprises a first discharge cover that is configured to contact the compression unit and that defines a first discharge space among the plurality of discharge spaces, and a second discharge cover that defines a second discharge space among the plurality of discharge spaces, the second discharge space being configured to receive refrigerant from the first discharge space,
- wherein the gas bearing includes an inlet disposed outside of the first discharge space and covered by the second discharge cover, the inlet being separate from the first discharge space and in communication with the second discharge space, and
- wherein the first discharge cover further defines a discharge guide groove that is recessed toward the compression unit in an axial direction of the cylinder.

22. The linear compressor of claim 21, further comprising a connection pipe configured to communicate with one or more of the plurality of discharge spaces other than the first discharge space, and
- wherein the discharge guide groove is configured to receive at least a portion of the connection pipe.

23. The linear compressor of claim 22, wherein one or more of the plurality of the discharge covers are configured to cover a portion of the discharge guide groove, and
- wherein the connection pipe is configured to insert into the discharge guide groove through the one or more of the plurality of discharge covers that cover the portion of the discharge guide groove.

* * * * *